US011825316B2

(12) United States Patent
Chou et al.

(10) Patent No.: US 11,825,316 B2
(45) Date of Patent: Nov. 21, 2023

(54) RANDOM ACCESS CHANNEL (RACH) OPTIMIZATION IN 5G NETWORKS

(71) Applicant: Intel Corporation, Santa Clara, CA (US)

(72) Inventors: Joey Chou, Scottsdale, AZ (US); Yizhi Yao, Chandler, AZ (US); Ansab Ali, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 180 days.

(21) Appl. No.: 17/037,477

(22) Filed: Sep. 29, 2020

(65) Prior Publication Data

US 2021/0014703 A1     Jan. 14, 2021

Related U.S. Application Data

(60) Provisional application No. 62/908,384, filed on Sep. 30, 2019.

(51) Int. Cl.
*H04W 24/02* (2009.01)
*H04W 74/08* (2009.01)
*H04W 72/21* (2023.01)
*H04W 72/542* (2023.01)

(52) U.S. Cl.
CPC .......... *H04W 24/02* (2013.01); *H04W 72/21* (2023.01); *H04W 72/542* (2023.01); *H04W 74/0866* (2013.01)

(58) Field of Classification Search
CPC ............. H04W 24/02; H04W 74/0866; H04W 72/085; H04W 72/0413; H04W 72/21; H04W 72/542; H04W 74/0808; H04W 74/0833; H04W 74/008; H04W 56/001
See application file for complete search history.

(56) References Cited

U.S. PATENT DOCUMENTS

| | | | | |
|---|---|---|---|---|
| 8,824,306 | B2* | 9/2014 | Frenger | H04W 74/0833 |
| | | | | 370/344 |
| 2013/0089079 | A1* | 4/2013 | Amirijoo | H04W 24/08 |
| | | | | 370/336 |
| 2017/0048892 | A1* | 2/2017 | Chen | H04W 74/0841 |
| 2019/0335392 | A1* | 10/2019 | Qiao | H04W 48/18 |
| 2022/0070941 | A1* | 3/2022 | Farag | H04L 5/0051 |
| 2022/0141886 | A1* | 5/2022 | Takahashi | H04W 74/0866 |
| | | | | 370/329 |

OTHER PUBLICATIONS

J. Thota and A. Aijaz, "On Performance Evaluation of Random Access Enhancements for 5G uRLLC," 2019 IEEE Wireless Communications and Networking Conference (WCNC), 2019, pp. 1-7, doi: 10.1109/WCNC.2019.8885815. (Year: 2019).*

(Continued)

*Primary Examiner* — Ricardo H Castaneyra
(74) *Attorney, Agent, or Firm* — Schwabe, Williamson & Wyatt, P.C.

(57) ABSTRACT

Methods, systems, and storage media are described for configuring RACH parameters in a cell in order to achieve the optimal RACH performance. In particular, some embodiments relate to determining RACH parameters based on RACH optimization targets. Other embodiments may be described and/or claimed.

11 Claims, 13 Drawing Sheets

(56) References Cited

OTHER PUBLICATIONS

3GPP, "Technical Specification Group Services and System Aspects; Telecommunication Management; Self-Organizing Networks (SON); Concepts and requirements (Release 15)," 3GPP TS 32.500 V15.0.0 (Jun. 2018), 5G, 13 pages.

3GPP, "Technical Specification Group Services and System Aspects; Management and orchestration; Generic management services; (Release 16)," 3GPP TS 28.532 V16.1.0 (Sep. 2019), 5G, 206 pages.

3GPP, "Technical Specification Group Radio Access Network; Study on RAN-centric data collection and utilization for LTE and NR (Release 16)," 3GPP TR 37.816 V16.0.0 (Jul. 2019), 5G, 35 pages.

3GPP, "Technical Specification Group Radio Access Network; NR; Medium Access Control (MAC) protocol specification (Release 15)," 3GPP TS 38.321 V15.7.0 (Sep. 2019), 5G, 78 pages.

3GPP, "Technical Specification Group Radio Access Network; NR; Physical channels and modulation (Release 15)," 3GPP TS 38.211 V15.7.0 (Sep. 2019), 5G, 97 pages.

3GPP, "Technical Specification Group Radio Access Network; NR; Radio Resource Control (RRC) protocol specification (Release 15)," 3GPP TS 38.331 V15.7.0 (Sep. 2019), 5G, 527 pages.

* cited by examiner

100

Retrieving RACH optimization information from memory, wherein the RACH optimization information comprises an indication of one or more RACH optimization targets, including a RACH optimization target associated with a user equipment (UE) access delay probability
105

Configuring the one or more RACH optimization targets for a RACH optimization function
110

Configuring one or more random access channel (RACH) optimization targets for a RACH optimization function, wherein the one or more RACH optimization targets include a RACH optimization target associated with a user equipment (UE) access delay probability
305

Enabling the RACH optimization function for a new radio (NR) cell
310

RANDOM ACCESS CHANNEL (RACH) OPTIMIZATION IN 5G NETWORKS

RELATED APPLICATIONS

This application claims priority to U.S. Provisional Patent Application No. 62/908,384 filed Sep. 30, 2019 and entitled "RANDOM ACCESS CHANNEL (RACH) OPTIMIZATION IN 5G NETWORKS," the entire disclosure of which is incorporated by reference in its entirety.

FIELD

Embodiments of the present disclosure relate generally to the technical field of wireless communications.

BACKGROUND

Among other things, embodiments of the present disclosure relate to configuring RACH parameters in a cell in order to achieve the optimal RACH performance. In particular, some embodiments relate to determining RACH parameters based on RACH optimization targets.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIGS. 1 and 2, and 3 illustrate examples of operation flow/algorithmic structures in accordance with some embodiments.

DETAILED DESCRIPTION

Figure 2:
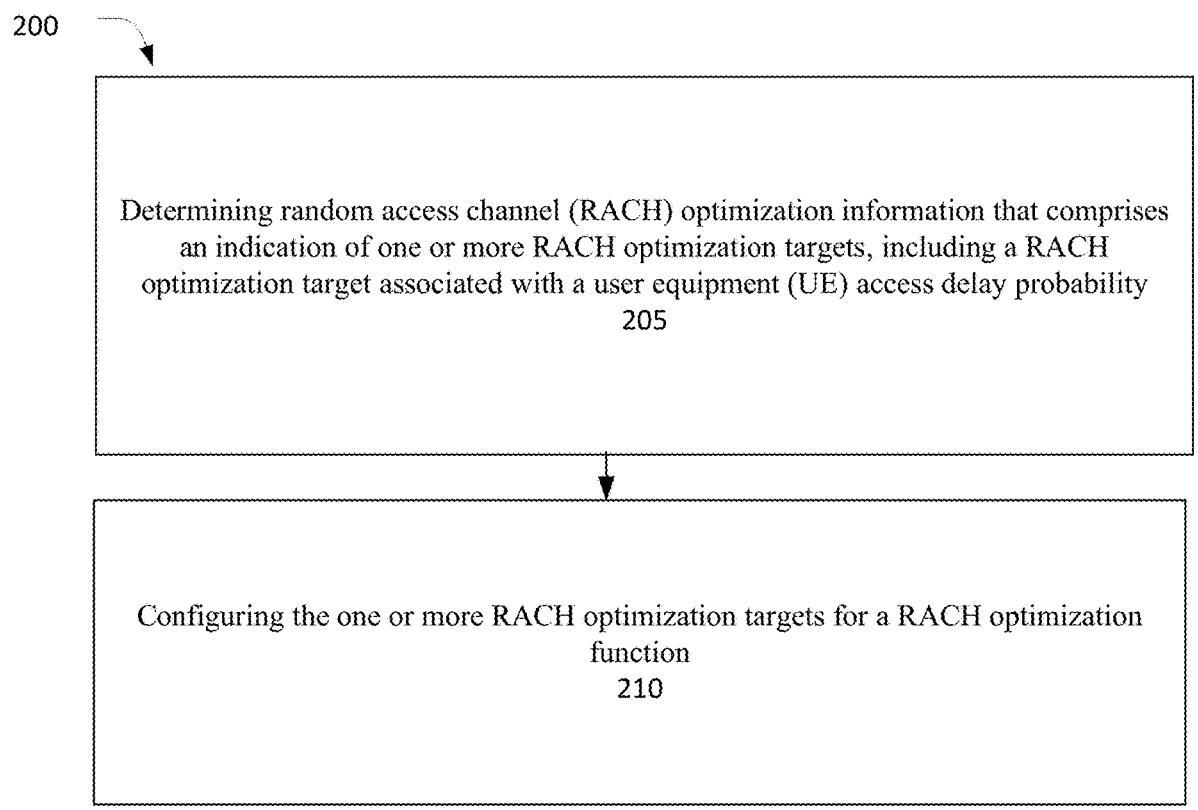

Among other things, embodiments of the present disclosure relate to configuring RACH parameters in a cell in order to achieve the optimal RACH performance. In particular, some embodiments relate to determining RACH parameters based on RACH optimization targets. Other embodiments may be described and/or claimed.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc., in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well-known devices, circuits, and methods are omitted so as not to obscure the description of the present invention with unnecessary detail.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in various embodiments," "in some embodiments," and the like may refer to the same, or different, embodiments. The terms "comprising," "having," and "including" are synonymous, unless the context dictates otherwise. The phrase "A and/or B" means (A), (B), or (A and B). The phrases "A/B" and "A or B" mean (A), (B), or (A and B), similar to the phrase "A and/or B." For the purposes of the present disclosure, the phrase "at least one of A and B" means (A), (B), or (A and B). The description may use the phrases "in an embodiment," "in embodiments," "in some embodiments," and/or "in various embodiments," which may each refer to one or more of the same or different embodiments. Furthermore, the terms "comprising," "including," "having," and the like, as used with respect to embodiments of the present disclosure, are synonymous.

Examples of embodiments may be described as a process depicted as a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function.

Examples of embodiments may be described in the general context of computer-executable instructions, such as program code, software modules, and/or functional processes, being executed by one or more of the aforementioned circuitry. The program code, software modules, and/or functional processes may include routines, programs, objects, components, data structures, etc., that perform particular tasks or implement particular data types. The program code, software modules, and/or functional processes discussed herein may be implemented using existing hardware in existing communication networks. For example, program code, software modules, and/or functional processes discussed herein may be implemented using existing hardware at existing network elements or control nodes.

In conventional fifth-generation (5G) systems, a poorly configured RACH (Random Access Channel) may increase the time it takes for a user equipment (UE) to access the network, and may increase the accesses failures, impacting both call setup and handover performance. However, to manually configure the RACH according to various radio access network (RAN) conditions can be a huge and costly task for operators. Among other things, RACH optimization can help automatically configure the RACH parameters in a cell in order to achieve the optimal RACH performance by reducing the network access and handoff time, and minimize the failures.

Figure 4A:
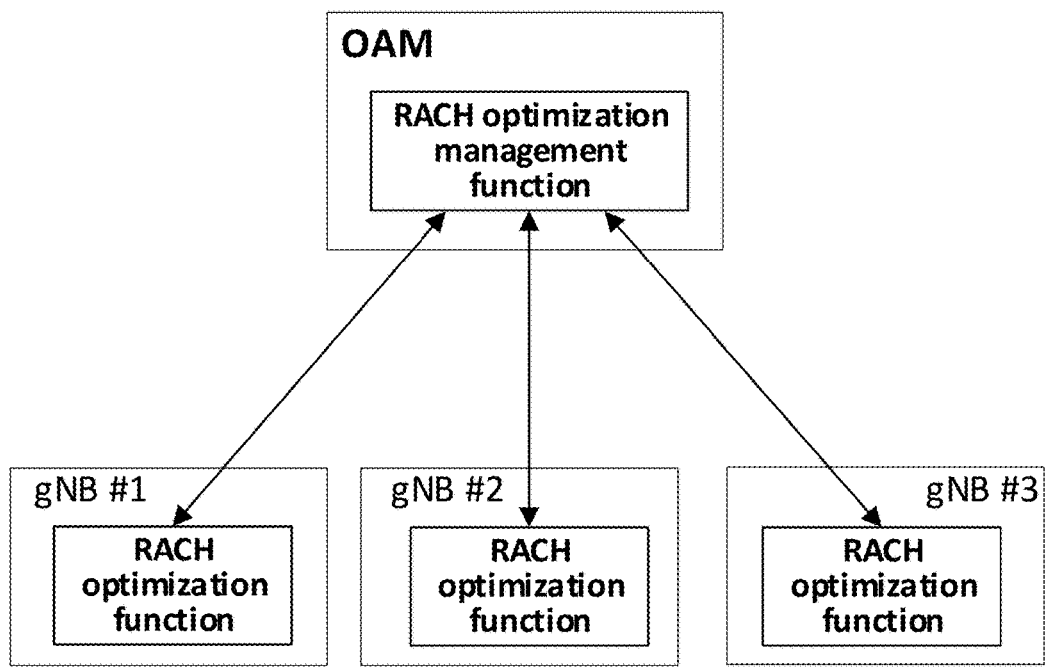
FIG. 4A illustrates an example of a RACH optimization architecture in accordance with some embodiments.

FIG. 4A shows an example of a RACH optimization architecture in accordance with some embodiments of the present disclosure, where the RACH optimization management system manages and controls the RACH optimization functions residing in a next-generation NodeB (gNB). The example in FIG. 4A may be implemented as a distributed self-organizing network (SON) function. Additionally, embodiments of the present disclosure may be directed to methods of Load Balancing Optimization (LBO) and Mobility Robustness Optimization (MRO).

In FIG. 4A the RACH optimization management function is illustrated as being implemented via an operations administration and maintenance (OAM) system. In some embodiments, the RACH optimization management function may be implemented by a next-generation NodeB (gNB). In some embodiments, for example, self-organizing networks (SON) may include centralized SON, distributed SON, and hybrid SON that are described below. In some embodiments, the RACH optimization function is a distributed SON, where the RACH optimization management function performs the management and evaluation task.

Centralized SON

Figure 4B:
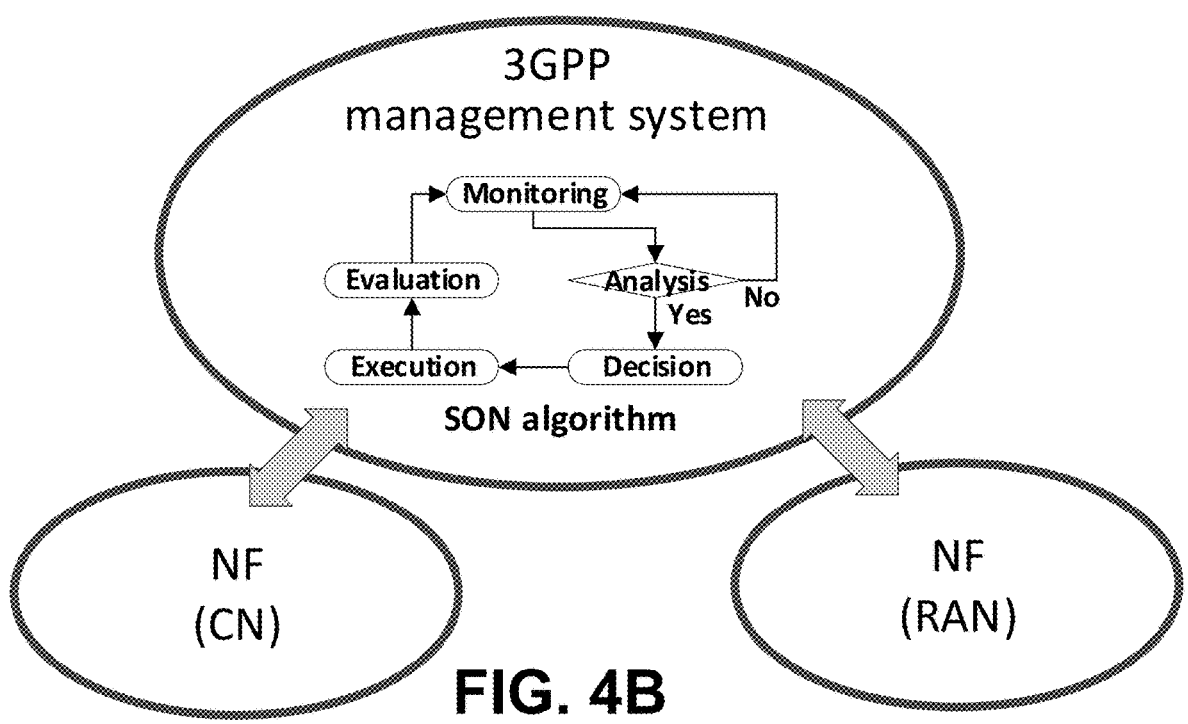
FIG. 4B illustrates an example of a centralized self-organizing network process in accordance with some embodiments.

In some embodiments, centralized SON (C-SON) means that the SON algorithm is located in the 3GPP management system. The centralized SON concept has been defined for LTE. FIG. 4B illustrates an example of a C-SON process, where the SON algorithm residing in the 3GPP management system interacts with network functions in RAN and CN to implement the SON functions. In some embodiments, the SON algorithm may include the following steps:

1. Monitoring: monitor the networks by collecting the management data, including the data provided by MDAS (see NOTE 1).
2. Analysis: analyze the management data to determine if there are issues in the RAN or CN needed to resolved.
3. Decision: makes the decision on the SON actions to resolve the issues.
4. Execution: execute the SON actions.
5. Evaluation: evaluate whether the issues have been solved by analyzing the management data, and may apply new SON actions.

NOTE 1: the management data may vary for different SON cases. For example, for automated creation of a network slice instance (NSI), network slice subnet instance (NSSI) and/or network function (NF), the management data may include service layer agreement (SLA) requirements received from service management layer. For automated optimization related cases, the management data may include performance measurements of the networks. For automated healing related cases, the management data may include alarm information for the networks. The management data is to be specified case by case.

Distributed SON

Figure 4C:
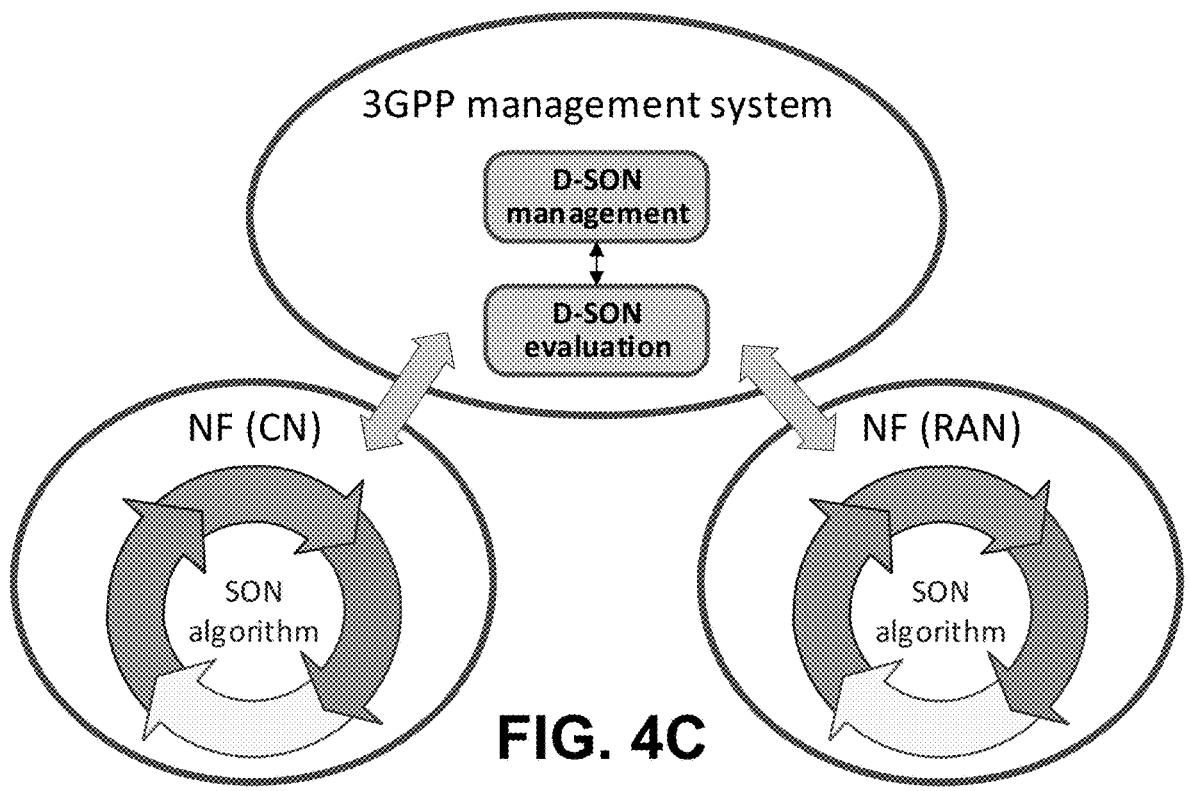
FIG. 4C illustrates an example of a distributed self-organizing network process in accordance with some embodiments.

In some embodiments, distributed SON (D-SON) means the SON algorithm is located in the NFs. The distributed SON concept has been defined for LTE. For D-SON, the NFs monitor the network events, analyze the network data, make decisions on the SON actions, and execute the SON actions in the network nodes. FIG. 4C illustrates an example of a D-SON process showing that the 3GPP management system is responsible for the following functions:

D-SON management function:
  Switch on/off a D-SON function,
  Provide policies, targets, and supplementary information (e.g., the range attributes) to a D-SON function.
D-SON evaluation function: evaluate whether the issues have been resolved, and may apply D-SON management actions.

Hybrid SON

Figure 4D:
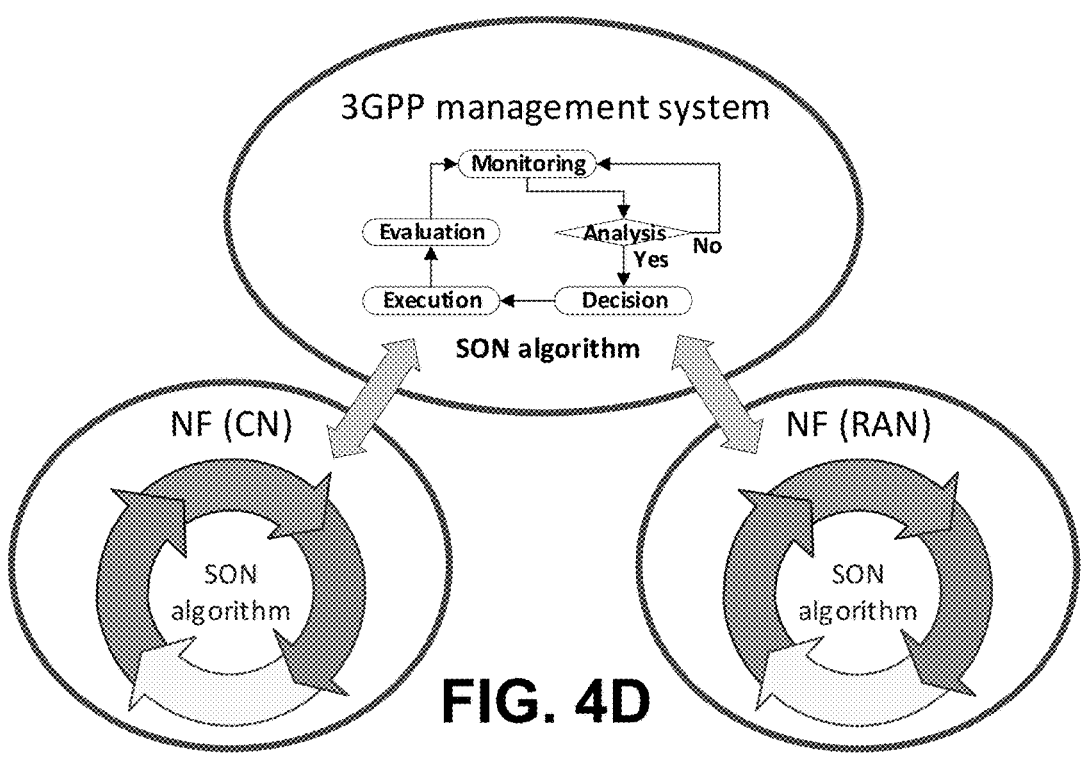
FIG. 4D illustrates an example of a hybrid self-organizing network process in accordance with some embodiments.

In some embodiments, hybrid SON (H-SON) means the SON algorithm is partially located in the 3GPP management system and partially located in the NFs. The hybrid SON concept has been defined for LTE. The 3GPP management system and NFs work together, in a coordinated manner, to build up a complete SON algorithm. The decisions on SON actions may be either made by 3GPP management system or NFs, depending on the specific cases. FIG. 4D illustrates an example of an H-SON process where that the C-SON component is monitoring and executes SON actions in and across RAN and Core.

Embodiments of the present disclosure may include any of the following: RACH Optimization requirements; RACH Optimization use cases; RACH Optimization procedures; and/or information definitions to support RACH optimization.

RACH Optimization (Random Access Optimization)

REQ-RACH-FUN-1 RACH optimization management function should have a capability to set and update the targets for RACH optimization function.

REQ-RACH-FUN-2 RACH optimization management function should have a capability to set and update the ranges of RACH parameters.

REQ-RACH-FUN-3 RACH optimization management function should have a capability to enable or disable the RACH optimization function.

REQ-RACH-FUN-4 RACH optimization management function should have a capability to collect performance measurements that are used to evaluate the RACH performance.

REQ-RACH-FUN-5 RACH optimization management function should have a capability to update the RACH parameters.

REQ-RACH-FUN-6 RACH optimization management function should have a capability to receive a notification indicating that the RACH parameters have been changed.

RACH Optimization (Random Access Optimization)

| Use case stage | Evolution/Specification | <<Uses>> Related use |
|---|---|---|
| Goal | To automatically configure the RACH parameters in a cell in order to achieve the optimal network performance by reducing the network access time, and minimize the failures. | |
| Actors and Roles | An authorized consumer of the RACH optimization management function. | |
| Telecom resources | gNB; The RACH optimization management function | |
| Assumptions | N/A | |
| Pre-conditions | 5G NR cells are in operation. RACH optimization management function is in operation. | |
| Begins when | The RACH optimization management function has been deployed. | |
| Step 1 (M) | The RACH optimization management function sets the targets for the RACH optimization function. | |
| Step 2 (M) | The RACH optimization management function sets the ranges of the RACH parameters for a NR cell. | |
| Step 3 (M) | The RACH optimization management function enables the RACH optimization function. | |
| Step 4 (M) | The RACH optimization function determines to optimize the RACH performance by adjusting RACH parameters (see clause 5.5.2 in TR 37.861 [z]), resulting in a notification being sent to the RACH optimization management function, indicating the RACH parameters have been changed. | |
| Step 5 (M) | The RACH optimization management function collects the RACH related measurements, and analyze them to evaluate the RACH performance. | |
| Step 6 (M) | The RACH optimization management function performs one of the following actions, if the RACH performance does not meet the target: 1. Update the targets for RACH optimization function; 2. Update the ranges of RACH parameters for the NR cell; 3. Disable RACH optimization function, and configure the RACH parameters for the NR cells with values to improve the RACH performance. | |
| Ends when | All the steps identified above are successfully completed. | |
| Exceptions | One of the steps identified above fails. | |
| Post-conditions | The RACH performance has been optimized. | |
| Traceability | REQ-RACH-FUN-1, REQ-RACH-FUN-2, REQ-RACH-FUN-3, REQ-RACH-FUN-4, REQ-RACH-FUN-5, REQ-RACH-FUN-6 | |

RACH Optimization (Random Access Optimization)

Figure 4E:
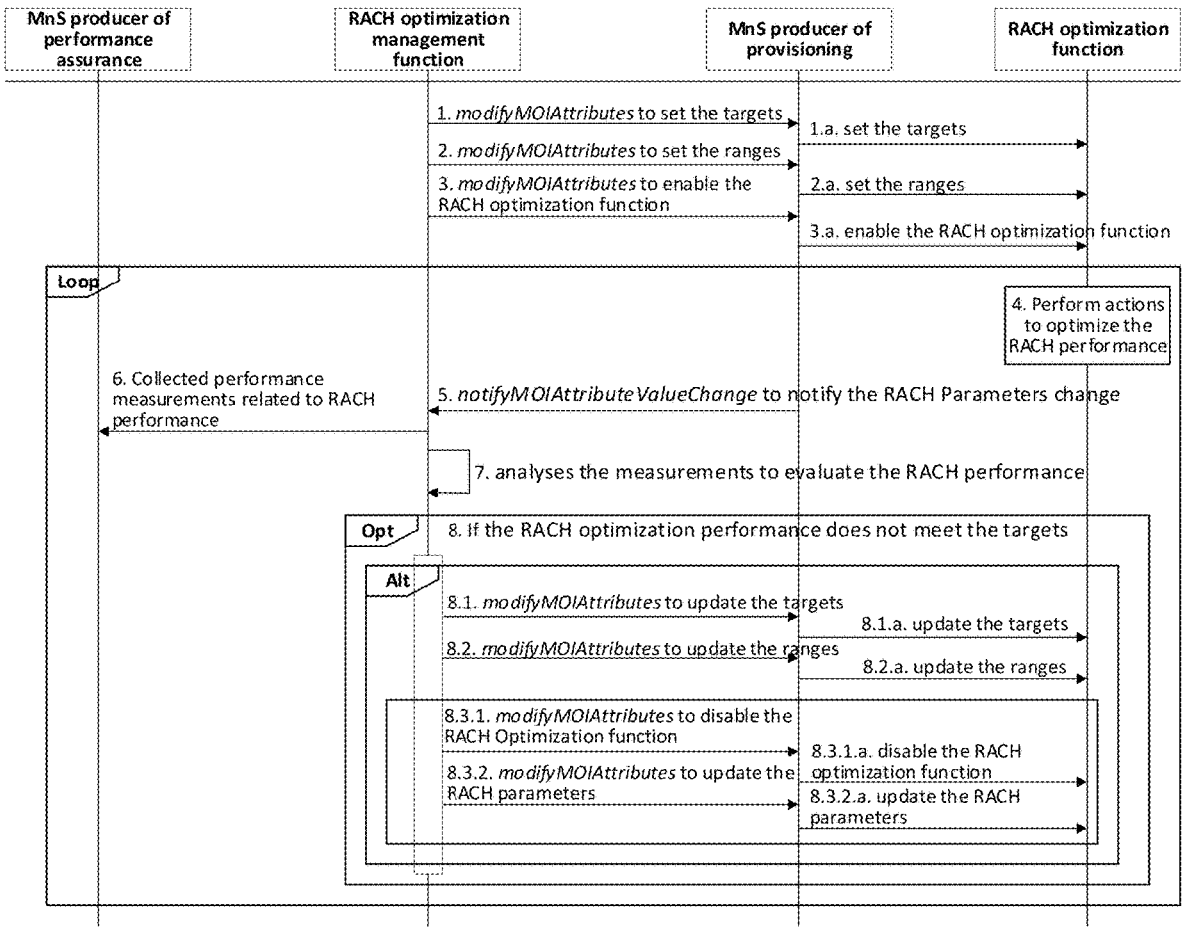
FIG. 4E illustrates an example of a RACH optimization procedure in accordance with some embodiments.

FIG. 4E depicts an example of a procedure in accordance with some embodiments that describes how RACH optimization management function can manage the RACH optimization function. In some embodiments, it is assumed that the RACH optimization management function has consumed the management service to collect RACH optimization-related measurements. In the example illustrated in FIG. 4E:

1. The RACH optimization management function consumes the MnS of provisioning with modifyMOIAttributes operation (see clause 5.1.3 in TS 28.532, v. 16.1.0, 2019 Sep. 27) to configure the targets for RACH optimization function (see clause 5.5.1 in TR 37.816, v. 16.0.0, 2019 Jul. 23).
1.a The MnS of provisioning sets the targets for RACH optimization function (NOTE).
2. The RACH optimization management function consumes the management service for NF provisioning with modifyMOIAttributes operation to configure the ranges of RACH parameters.
2.a The MnS of provisioning sets the ranges for RACH optimization function (see NOTE2 below).
3. The RACH optimization management function consumes the management service for NF provisioning with modifyMOIAttributes operation to enable the RACH optimization function for a given NR cell.
3.a The MnS of provisioning enables the RACH optimization function (see NOTE2 below).
4. The RACH optimization function receives the RACH information report from UE(s), and analyses them to determine the actions to optimize the RACH performance if the performance does not meet the targets by updating the RACH parameters (see clause 5.5.2 in TR 37.816).
5. The MnS of provisioning to send a notification notifyMOIAttributeValueChange to the RACH optimization management function, indicating that the RACH parameters have been changed.
6. The RACH optimization management function collects the RACH related performance measurements.
7. The RACH optimization management function analyses the measurements to evaluate the RACH performance.
8. The RACH optimization management function performs one of the following actions, when the RACH optimization performance does not meet the targets:
8.1. Consume the MnS of provisioning with modifyMOIAttributes operation to update the targets of the RACH optimization function;
8.1.a The MnS of provisioning updates the targets for RACH optimization function (see NOTE2 below);

8.2. Consume the MnS of provisioning with modifyMOI-Attributes operation to update the ranges of the RACH parameters;

8.2.a The MnS of provisioning updates the ranges for RACH optimization function (see NOTE2 below).

8.3.1 Consume the MnS of provisioning with modify-MOIAttributes operation to disable RACH optimization function.

8.3.1.a The MnS of provisioning disables the RACH optimization function (see NOTE2 below).

8.3.2 Consume the MnS of provisioning with modify-MOIAttributes operation to update the RACH parameters.

8.3.2.a The MnS of provisioning updates the RACH parameters (see NOTE2 below).

NOTE 2: The interface between MnS of provisioning and RACH optimization is not subject to standardization.

RACH Optimization (Random Access Optimization)

In accordance with some embodiments, targets of RACH optimization are shown in the table below.

| Target Name | Definition | Legal Values |
| --- | --- | --- |
| UE access delay probability | The probability distribution of UE access delay that is used to minimize the access delays for the UEs under the coverage of popular SSBs (see clause 5.5.1 in TR 37.816). | CDF of access delay |

In some cases, the definition of targets to support the following targets described in TR 37.816 may be clarified from RAN3, including targets such as: minimizing the delays for the UEs to request the other SIs; minimizing the imbalance of UEs access delays on uplink (UL) and supplementary uplink (SUL) channel; minimizing the beam failure recovery delays for the UEs in RRC_Connected; and/or minimizing the failed/unnecessary RACH attempts on RACH resource before success.

The table below illustrates examples of control information in accordance with some embodiments.

| Control name | Definition | Legal Values |
| --- | --- | --- |
| RACH optimization control | This attribute allows the operator to enable/disable the RACH optimization functionality. | Boolean On, off |

Example of parameters to be updated by the RACH optimization (see clause 5.1.1 in TS 38.321, v. 15.7.0, 2019 Sep. 27) are shown in the table below. Please note that in this table, a and b stand for the beginning and the end of the range, respectively.

| Control name | Definition | Legal Values |
| --- | --- | --- |
| RACH configuration index | Provides the PRACH configuration information, such as preamble format, subframe number, starting OFDM symbol, . . . etc, where the index is mapped to the PRACH configuration index in Table 6.3.3.2-2, Table 6.3.3.2-3, Table 6.3.3.2-4 in TS 38.211, v. 15.7.0, 2018 Sep. 28. | 0 . . . 255 |
| Number of preambles per SSB | Provide the information about the number of SSBs per RACH occasion that indicates the number of preambles per SSB, where the value oneEight corresponds to one SSB associated with 8 RACH occasions, value oneFourth corresponds to one SSB associated with 4 RACH occasions, and so on. The parameter is mapped to perRACH-OccasionAndCB-PreamblesPerSSB in TS 38.331, v. 15.7.0, 2019 Sep. 27. | ½, ¼, 1, 2, 4, 8, 16 |

| Control name | Definition | Legal Values |
| --- | --- | --- |
| Number of preambles per in group A | Provide the the number of CB preambles per SSB in group A, and is mapped to numberOfRA-PreamblesGroupA in TS 38.331 [c]. | 1 . . . 64 |
| Total number of RACH preamble | Provide the total number of preambles used for contention based and contention free random access, and is mapped to totalNumberOfRA-Preambles in TS 38.331. | 1 . . . 63 |
| Scaling factor for backoff | Provide the scaling factor for the backoff indicator (BI) for the prioritized random access procedure, and is mapped to scalingFactorBI in TS 38.331. | 0, .0.25, 0.5, 0.75 |
| Power raming step for backoff | Provide the power ramping step applied for the prioritized random access procedure, and is mapped to powerRampingStepHighPriority in TS 38.331. | dB0, dB2, dB4, dB6 |
| Preamble received target power | Provide the target power level at the network receiver side, and is mapped to preambleReceivedTargetPower in TS 38.331. | −202 . . . −60 |
| Maximum number of RA preamble transmission | Provide the max number of RA preamble transmission performed before declaring a failure, and is mapped to preambleTransMax in TS 38.331. | n3, n4, n5, n6, n7, n8, n10, n20, n50, n100, n200 |
| Power ramping steps | Provide the power ramping steps for PRACH, and is mapped to powerRampingStep in TS 38.331. | dB0, dB2, dB4, dB6 |
| Contention resource timer | Provide the contention resolution timer (SpCell only) that is mapped to ra-ContentionResolutionTimer in TS 38.331, where the value sfn corresponds to n subframes. | sf8, sf16, sf24, sf32, sf40, sf48, sf56, sf64 |
| RACH response window | Provide the time window to monitor RACH response(s) (SpCell only), and is mapped to ra-ResponseWindow in TS38.331. | sl1, sl2, sl4, sl8, sl10, sl20, sl40, sl80 |
| Range of RACH configuration index | Provide the range of RACH configuration index, | a, b (NOTE) |
| Range of number of preambles per SSB | Provide the range of number of preambles per SSB. | a, b (NOTE) |
| Range of number of preambles per in group A | Provide the range of number of preambles per in group A. | a, b (NOTE) |
| Range of total number of RACH preamble | Provide the range of total number of RACH preamble. | a, b (NOTE) |
| Range of scaling factor for backoff | Provide the range of scaling factor for backoff. | a, b (NOTE) |
| Range of power raming step for backoff | Provide the range of power raming step for backoff. | a, b (NOTE) |
| Range of preamble received target power | Provide the range of preamble received target power. | a, b (NOTE) |
| Range of maximum number of RA preamble transmission | Provide the range of maximum number of RA preamble transmission. | a, b (NOTE) |
| Range of power ramping steps | Provide the range of power ramping steps. | a, b (NOTE) |
| Range of contention resource timer | Provide the range of contention resource timer. | a, b (NOTE) |
| Range of RACH response window | Provide the range of RACH response window. | a, b (NOTE) |

Examples of performance measurements related to RACH optimization in accordance with some embodiments are shown in the table below.

| Performance measurement name | Description | Related targets |
| --- | --- | --- |
| Distribution of RACH preambles sent | Distribution of the number of preambles UEs sent to achieve synchronization, where the number of preambles sent corresponds to PREAMBLE_TRANSMISSION_COUNTER (see clause 5.1.1 in TS 38.321) in UE. | UE access delay probability |
| Distribution of UEs access delay | Distribution of the time needed for UEs to successfully attach to the network. | UE access delay probability |

Figure 5:
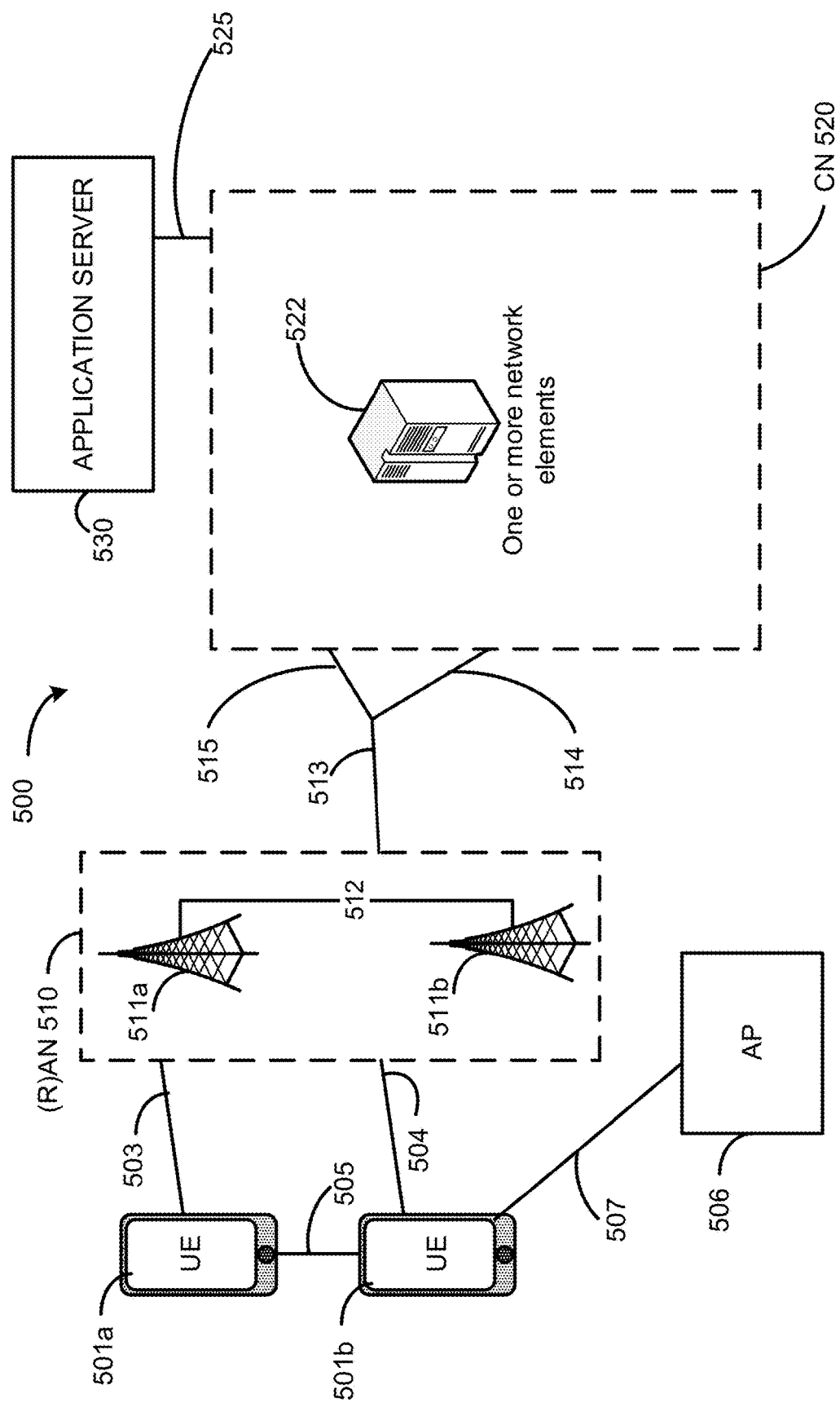
FIG. 5 illustrates an example architecture of a system of a network in accordance with various embodiments.

FIG. 5 illustrates an example architecture of a system 500 of a network, in accordance with various embodiments. The following description is provided for an example system 500 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 5, the system 500 includes UE 501a and UE 501b (collectively referred to as "UEs 501" or "UE 501"). In this example, UEs 501 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, any of the UEs 501 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 501 may be configured to connect, for example, communicatively couple, with an or RAN 510. In embodiments, the RAN 510 may be an NG RAN or a 5G RAN, an E-UTRAN, or a legacy RAN, such as a UTRAN or GERAN. As used herein, the term "NG RAN" or the like may refer to a RAN 510 that operates in an NR or 5G system 500, and the term "E-UTRAN" or the like may refer to a RAN 510 that operates in an LTE or 4G system 500. The UEs 501 utilize connections (or channels) 503 and 504, respectively, each of which comprises a physical communications interface or layer (discussed in further detail below).

In this example, the connections 503 and 504 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UEs 501 may directly exchange communication data via a ProSe interface 505. The ProSe interface 505 may alternatively be referred to as a SL interface 505 and may comprise one or more logical channels, including but not limited to a PSCCH, a PSSCH, a PSDCH, and a PSBCH.

The UE 501b is shown to be configured to access an AP 506 (also referred to as "WLAN node 506," "WLAN 506," "WLAN Termination 506," "WT 506" or the like) via connection 507. The connection 507 can comprise a local wireless connection, such as a connection consistent with any IEEE 802.11 protocol, wherein the AP 506 would comprise a wireless fidelity (Wi-Fi®) router. In this example, the AP 506 is shown to be connected to the Internet without connecting to the core network of the wireless system (described in further detail below). In various embodiments, the UE 501b, RAN 510, and AP 506 may be configured to utilize LWA operation and/or LWIP operation. The LWA operation may involve the UE 501b in RRC_CONNECTED being configured by a RAN node 511a-b to utilize radio resources of LTE and WLAN. LWIP operation may involve the UE 501b using WLAN radio resources (e.g., connection 507) via IPsec protocol tunneling to authenticate and encrypt packets (e.g., IP packets) sent over the connection 507. IPsec tunneling may include encapsulating the entirety of original IP packets and adding a new packet header, thereby protecting the original header of the IP packets.

The RAN 510 can include one or more AN nodes or RAN nodes 511a and 511b (collectively referred to as "RAN nodes 511" or "RAN node 511") that enable the connections 503 and 504. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 511 that operates in an NR or 5G system 500 (for example, a gNB), and the term "E-UTRAN node" or the like may refer to a RAN node 511 that operates in an LTE or 4G system 500 (e.g., an eNB). According to various embodiments, the RAN nodes 511 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN nodes 511 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 511; a MAC/PHY split wherein RRC, PDCP, RLC, and MAC layers are operated by the CRAN/vBBUP and the PHY layer is operated by individual RAN nodes 511; or a "lower PHY" split wherein RRC, PDCP, RLC, MAC layers and upper portions of the PHY layer are operated by the CRAN/vBBUP and lower portions of the PHY layer are operated by individual RAN nodes 511. This virtualized framework allows the freed-up processor cores of the RAN nodes 511 to perform other virtualized applications. In some implementations, an individual RAN node 511 may represent individual gNB- DUs that are connected to a gNB-CU via individual F1 interfaces (not shown by FIG. 5). In these implementations, the gNB-DUs may include one or more remote radio heads or RFEMs (see, e.g., FIG. 7A), and the gNB-CU may be operated by a server that is located in the RAN 510 (not shown) or by a server pool in a similar manner as the CRAN/vBBUP. Additionally or alternatively, one or more of the RAN nodes 511 may be next generation eNBs (ng-eNBs), which are RAN nodes that provide E-UTRA user plane and control plane protocol terminations toward the UEs 501, and are connected to a 5GC (e.g., CN 6220 of FIG. 6B) via an NG interface (discussed infra).

In V2X scenarios one or more of the RAN nodes 511 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 501 (vUEs 501). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 511 can terminate the air interface protocol and can be the first point of contact for the UEs 501. In some embodiments, any of the RAN nodes 511 can fulfill various logical functions for the RAN 510 including, but not limited to, radio network controller (RNC) functions such as radio bearer management, uplink and downlink dynamic radio resource management and data packet scheduling, and mobility management.

In embodiments, the UEs 501 can be configured to communicate using OFDM communication signals with each other or with any of the RAN nodes 511 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 511 to the UEs 501, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 501 and the RAN nodes 511 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 501 and the RAN nodes 511 may operate using LAA, eLAA, and/or feLAA mechanisms. In these implementations, the UEs 501 and the RAN nodes 511 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 501 RAN nodes 511, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 501, AP 506, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (μs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 501 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 501. The PDCCH carries information about the transport format and resource allocations related to the PDSCH channel, among other things. It may also inform the UEs 501 about the transport format, resource allocation, and HARQ information related to the uplink shared channel. Typically, downlink scheduling (assigning control and shared channel resource blocks to the UE 501b within a cell) may be performed at any of the RAN nodes 511 based on channel quality information fed back from any of the UEs 501. The downlink resource assignment information may be sent on the PDCCH used for (e.g., assigned to) each of the UEs 501.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN nodes 511 may be configured to communicate with one another via interface 512. In embodiments where the system 500 is an LTE system (e.g., when CN 520 is an EPC 6120 as in FIG. 6A), the interface 512 may be an X2 interface 512. The X2 interface may be defined between two or more RAN nodes 511 (e.g., two or more eNBs and the like) that connect to EPC 520, and/or between two eNBs connecting to EPC 520. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 501 from an SeNB for user data; information of PDCP PDUs that were not delivered to a UE 501; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 500 is a 5G or NR system (e.g., when CN 520 is an 5GC 6220 as in FIG. 6B), the interface 512 may be an Xn interface 512. The Xn interface is defined between two or more RAN nodes 511 (e.g., two or more gNBs and the like) that connect to 5GC 520, between a RAN node 511 (e.g., a gNB) connecting to 5GC 520 and an eNB, and/or between two eNBs connecting to 5GC 520. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 501 in a connected mode (e.g., CM-CONNECTED) including functionality to manage the UE mobility for connected mode between one or more RAN nodes 511. The mobility support may include context transfer from an old (source) serving RAN node 511 to new (target) serving RAN node 511; and control of user plane tunnels between old (source) serving RAN node 511 to new (target) serving RAN node 511. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 510 is shown to be communicatively coupled to a core network—in this embodiment, core network (CN) 520. The CN 520 may comprise a plurality of network elements 522, which are configured to offer various data and telecommunications services to customers/subscribers (e.g., users of UEs 501) who are connected to the CN 520 via the RAN 510. The components of the CN 520 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 520 may be referred to as a network slice, and a logical instantiation of a portion of the CN 520 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 530 may be an element offering applications that use IP bearer resources with the core network (e.g., UMTS PS domain, LTE PS data services, etc.). The application server 530 can also be configured to support one or more communication services (e.g., VoIP sessions, PTT sessions, group communication sessions, social networking services, etc.) for the UEs 501 via the EPC 520.

In embodiments, the CN 520 may be a 5GC (referred to as "5GC 520" or the like), and the RAN 510 may be connected with the CN 520 via an NG interface 513. In embodiments, the NG interface 513 may be split into two parts, an NG user plane (NG-U) interface 514, which carries traffic data between the RAN nodes 511 and a UPF, and the S1 control plane (NG-C) interface 515, which is a signaling interface between the RAN nodes 511 and AMFs. Embodiments where the CN 520 is a 5GC 520 are discussed in more detail with regard to FIG. 6B.

In embodiments, the CN 520 may be a 5G CN (referred to as "5GC 520" or the like), while in other embodiments, the CN 520 may be an EPC). Where CN 520 is an EPC (referred to as "EPC 520" or the like), the RAN 510 may be connected with the CN 520 via an S1 interface 513. In embodiments, the S1 interface 513 may be split into two parts, an S1 user plane (S1-U) interface 514, which carries traffic data between the RAN nodes 511 and the S-GW, and the S1-MME interface 515, which is a signaling interface between the RAN nodes 511 and MMEs.

Figure 6A:
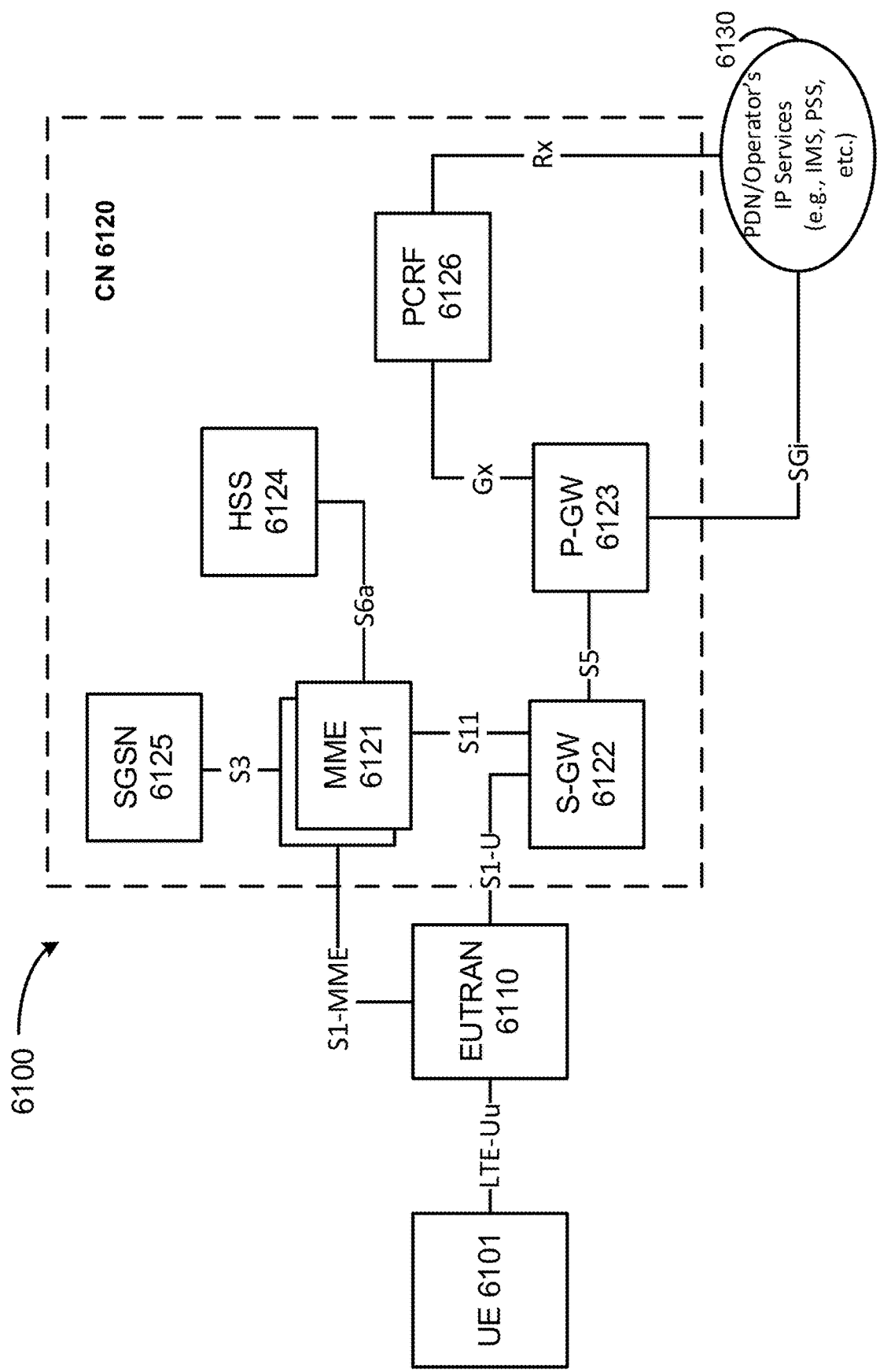
FIG. 6A illustrates an example architecture of a system including a first core network, in accordance with various embodiments.

FIG. 6A illustrates an example architecture of a system 6100 including a first CN 6120, in accordance with various embodiments. In this example, system 6100 may implement the LTE standard wherein the CN 6120 is an EPC 6120 that corresponds with CN 520 of FIG. 5. Additionally, the UE 6101 may be the same or similar as the UEs 501 of FIG. 5, and the E-UTRAN 6110 may be a RAN that is the same or similar to the RAN 510 of FIG. 5, and which may include RAN nodes 511 discussed previously. The CN 6120 may comprise MMEs 6121, an S-GW 6122, a P-GW 6123, a HSS 6124, and a SGSN 6125.

The MMEs 6121 may be similar in function to the control plane of legacy SGSN, and may implement MM functions to keep track of the current location of a UE 6101. The MMEs 6121 may perform various MM procedures to manage mobility aspects in access such as gateway selection and tracking area list management. MM (also referred to as "EPS MM" or "EMM" in E-UTRAN systems) may refer to all applicable procedures, methods, data storage, etc. that are used to maintain knowledge about a present location of the UE 6101, provide user identity confidentiality, and/or perform other like services to users/subscribers. Each UE 6101 and the MME 6121 may include an MM or EMM sublayer, and an MM context may be established in the UE 6101 and the MME 6121 when an attach procedure is successfully completed. The MM context may be a data structure or database object that stores MM-related information of the UE 6101. The MMEs 6121 may be coupled with the HSS 6124 via an S6a reference point, coupled with the SGSN 6125 via an S3 reference point, and coupled with the S-GW 6122 via an S11 reference point.

The SGSN 6125 may be a node that serves the UE 6101 by tracking the location of an individual UE 6101 and performing security functions. In addition, the SGSN 6125 may perform Inter-EPC node signaling for mobility between 2G/3G and E-UTRAN 3GPP access networks; PDN and S-GW selection as specified by the MMEs 6121; handling of UE 6101 time zone functions as specified by the MMEs 6121; and MME selection for handovers to E-UTRAN 3GPP access network. The S3 reference point between the MMEs 6121 and the SGSN 6125 may enable user and bearer information exchange for inter-3GPP access network mobility in idle and/or active states.

The HSS 6124 may comprise a database for network users, including subscription-related information to support the network entities' handling of communication sessions. The EPC 6120 may comprise one or several HSSs 6124, depending on the number of mobile subscribers, on the capacity of the equipment, on the organization of the network, etc. For example, the HSS 6124 can provide support for routing/roaming, authentication, authorization, naming/addressing resolution, location dependencies, etc. An S6a reference point between the HSS 6124 and the MMEs 6121 may enable transfer of subscription and authentication data for authenticating/authorizing user access to the EPC 6120 between HSS 6124 and the MMEs 6121.

The S-GW 6122 may terminate the S1 interface 513 ("S1-U" in FIG. 6A) toward the RAN 6110, and routes data packets between the RAN 6110 and the EPC 6120. In addition, the S-GW 6122 may be a local mobility anchor point for inter-RAN node handovers and also may provide an anchor for inter-3GPP mobility. Other responsibilities may include lawful intercept, charging, and some policy enforcement. The S11 reference point between the S-GW 6122 and the MMEs 6121 may provide a control plane between the MMEs 6121 and the S-GW 6122. The S-GW 6122 may be coupled with the P-GW 6123 via an S5 reference point.

The P-GW 6123 may terminate an SGi interface toward a PDN 6130. The P-GW 6123 may route data packets between the EPC 6120 and external networks such as a network including the application server 530 (alternatively referred to as an "AF") via an IP interface 525 (see e.g., FIG. 5). In embodiments, the P-GW 6123 may be communicatively coupled to an application server (application server 530 of FIG. 5 or PDN 6130 in FIG. 6A) via an IP communications interface 525 (see, e.g., FIG. 5). The S5 reference point between the P-GW 6123 and the S-GW 6122 may provide user plane tunneling and tunnel management between the P-GW 6123 and the S-GW 6122. The S5 reference point may also be used for S-GW 6122 relocation due to UE 6101 mobility and if the S-GW 6122 needs to connect to a non-collocated P-GW 6123 for the required PDN connectivity. The P-GW 6123 may further include a node for policy enforcement and charging data collection (e.g., PCEF (not shown)). Additionally, the SGi reference point between the P-GW 6123 and the packet data network (PDN) 6130 may be an operator external public, a private PDN, or an intra operator packet data network, for example, for provision of IMS services. The P-GW 6123 may be coupled with a PCRF 6126 via a Gx reference point.

PCRF 6126 is the policy and charging control element of the EPC 6120. In a non-roaming scenario, there may be a single PCRF 6126 in the Home Public Land Mobile Network (HPLMN) associated with a UE 6101's Internet Protocol Connectivity Access Network (IP-CAN) session. In a roaming scenario with local breakout of traffic, there may be two PCRFs associated with a UE 6101's IP-CAN session, a Home PCRF (H-PCRF) within an HPLMN and a Visited PCRF (V-PCRF) within a Visited Public Land Mobile Network (VPLMN). The PCRF 6126 may be communicatively coupled to the application server 6130 via the P-GW 6123. The application server 6130 may signal the PCRF 6126 to indicate a new service flow and select the appropriate QoS and charging parameters. The PCRF 6126 may provision this rule into a PCEF (not shown) with the appropriate TFT and QCI, which commences the QoS and charging as specified by the application server 6130. The Gx reference point between the PCRF 6126 and the P-GW 6123 may allow for the transfer of QoS policy and charging rules from the PCRF 6126 to PCEF in the P-GW 6123. An Rx reference point may reside between the PDN 6130 (or "AF 6130") and the PCRF 6126.

Figure 6B:
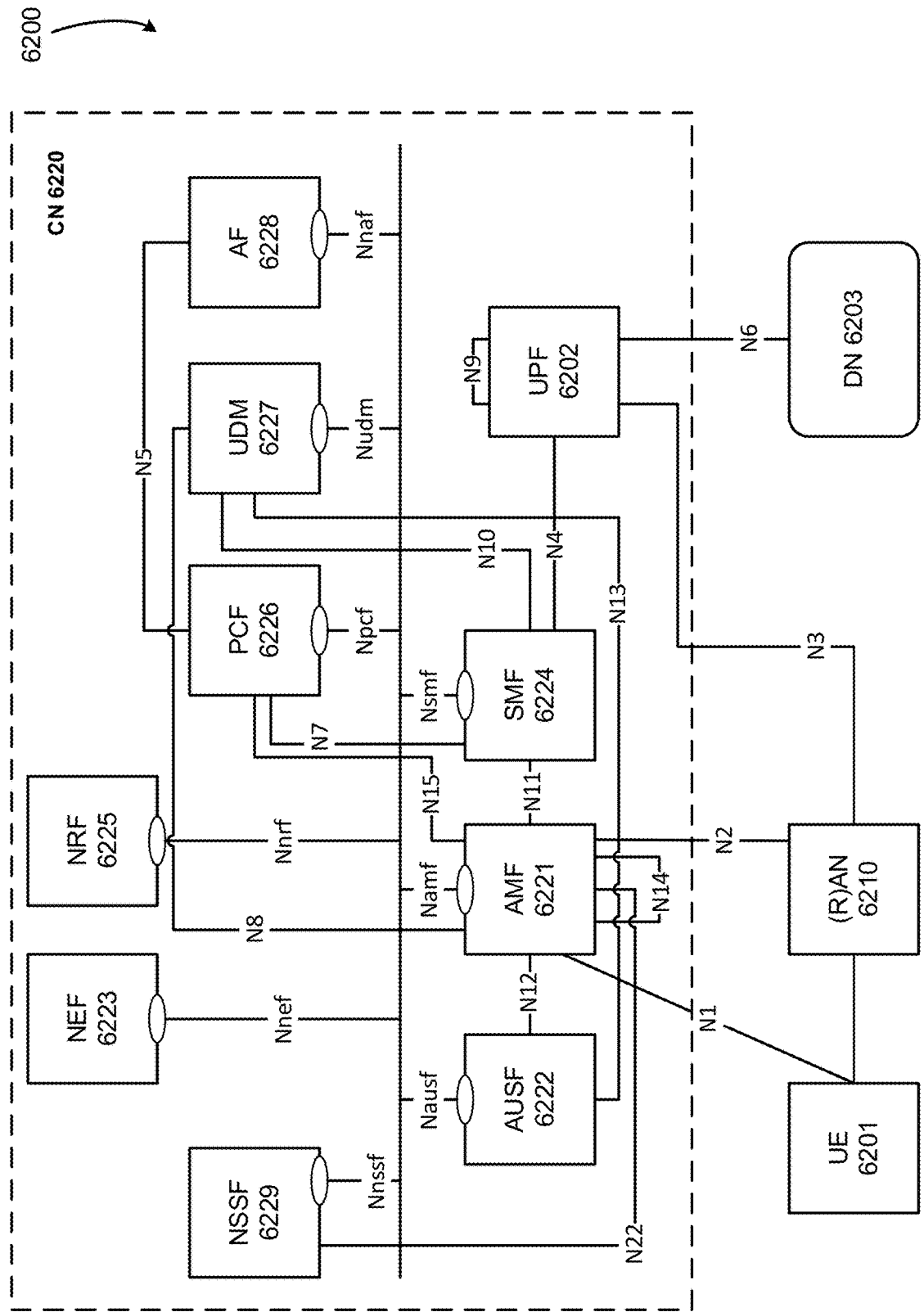
FIG. 6B illustrates an example architecture of a system including a second core network, in accordance with various embodiments.

FIG. 6B illustrates an architecture of a system 6200 including a second CN 6220 in accordance with various embodiments. The system 6200 is shown to include a UE 6201, which may be the same or similar to the UEs 501 and UE 6101 discussed previously; a (R)AN 6210, which may be the same or similar to the RAN 510 and RAN 6110 discussed previously, and which may include RAN nodes 511 discussed previously; and a DN 6203, which may be, for example, operator services, Internet access or 3rd party services; and a 5GC 6220. The 5GC 6220 may include an AUSF 6222; an AMF 6221; a SMF 6224; a NEF 6223; a PCF 6226; a NRF 6225; a UDM 6227; an AF 6228; a UPF 6202; and a NSSF 6229.

The UPF 6202 may act as an anchor point for intra-RAT and inter-RAT mobility, an external PDU session point of interconnect to DN 6203, and a branching point to support multi-homed PDU session. The UPF 6202 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform Uplink Traffic verification (e.g., SDF to QoS flow mapping), transport level packet marking in the uplink and downlink, and perform downlink packet buffering and downlink data notification triggering. UPF 6202 may include an uplink classifier to support routing traffic flows to a data network. The DN 6203 may represent various network operator services, Internet access, or third party services. DN 6203 may include, or be similar to, application server 530 discussed previously. The UPF 6202 may interact with the SMF 6224 via an N4 reference point between the SMF 6224 and the UPF 6202.

The AUSF 6222 may store data for authentication of UE 6201 and handle authentication-related functionality. The AUSF 6222 may facilitate a common authentication framework for various access types. The AUSF 6222 may communicate with the AMF 6221 via an N12 reference point between the AMF 6221 and the AUSF 6222; and may communicate with the UDM 6227 via an N13 reference point between the UDM 6227 and the AUSF 6222. Additionally, the AUSF 6222 may exhibit an Nausf service-based interface.

The AMF 6221 may be responsible for registration management (e.g., for registering UE 6201, etc.), connection management, reachability management, mobility management, and lawful interception of AMF-related events, and access authentication and authorization. The AMF 6221 may be a termination point for the an N11 reference point between the AMF 6221 and the SMF 6224. The AMF 6221 may provide transport for SM messages between the UE 6201 and the SMF 6224, and act as a transparent proxy for routing SM messages. AMF 6221 may also provide transport for SMS messages between UE 6201 and an SMSF (not shown by FIG. 6B). AMF 6221 may act as SEAF, which may include interaction with the AUSF 6222 and the UE 6201, receipt of an intermediate key that was established as a result of the UE 6201 authentication process. Where USIM based authentication is used, the AMF 6221 may retrieve the security material from the AUSF 6222. AMF 6221 may also include a SCM function, which receives a key from the SEA that it uses to derive access-network specific keys. Furthermore, AMF 6221 may be a termination point of a RAN CP interface, which may include or be an N2 reference point between the (R)AN 6210 and the AMF 6221; and the AMF 6221 may be a termination point of NAS (N1) signalling, and perform NAS ciphering and integrity protection.

AMF 6221 may also support NAS signalling with a UE 6201 over an N3 IWF interface. The N3IWF may be used to provide access to untrusted entities. N3IWF may be a termination point for the N2 interface between the (R)AN 6210 and the AMF 6221 for the control plane, and may be a termination point for the N3 reference point between the (R)AN 6210 and the UPF 6202 for the user plane. As such, the AMF 6221 may handle N2 signalling from the SMF 6224 and the AMF 6221 for PDU sessions and QoS, encapsulate/de-encapsulate packets for IPSec and N3 tunnelling, mark N3 user-plane packets in the uplink, and enforce QoS corresponding to N3 packet marking taking into account QoS requirements associated with such marking received over N2. N3IWF may also relay uplink and downlink control-plane NAS signalling between the UE 6201 and AMF 6221 via an N1 reference point between the UE 6201 and the AMF 6221, and relay uplink and downlink user-plane packets between the UE 6201 and UPF 6202. The N3IWF also provides mechanisms for IPsec tunnel establishment with the UE 6201. The AMF 6221 may exhibit an Namf service-based interface, and may be a termination point for an N14 reference point between two AMFs 6221 and an N17 reference point between the AMF 6221 and a 5G-EIR (not shown by FIG. 6B).

The UE 6201 may need to register with the AMF 6221 in order to receive network services. RM is used to register or deregister the UE 6201 with the network (e.g., AMF 6221), and establish a UE context in the network (e.g., AMF 6221). The UE 6201 may operate in an RM-REGISTERED state or an RM-DEREGISTERED state. In the RM DEREGISTERED state, the UE 6201 is not registered with the network, and the UE context in AMF 6221 holds no valid location or routing information for the UE 6201 so the UE

6201 is not reachable by the AMF 6221. In the RM REGISTERED state, the UE 6201 is registered with the network, and the UE context in AMF 6221 may hold a valid location or routing information for the UE 6201 so the UE 6201 is reachable by the AMF 6221. In the RM-REGISTERED state, the UE 6201 may perform mobility Registration Update procedures, perform periodic Registration Update procedures triggered by expiration of the periodic update timer (e.g., to notify the network that the UE 6201 is still active), and perform a Registration Update procedure to update UE capability information or to re-negotiate protocol parameters with the network, among others.

The AMF 6221 may store one or more RM contexts for the UE 6201, where each RM context is associated with a specific access to the network. The RM context may be a data structure, database object, etc. that indicates or stores, inter alia, a registration state per access type and the periodic update timer. The AMF 6221 may also store a 5GC MM context that may be the same or similar to the (E)MM context discussed previously. In various embodiments, the AMF 6221 may store a CE mode B Restriction parameter of the UE 6201 in an associated MM context or RM context. The AMF 6221 may also derive the value, when needed, from the UE's usage setting parameter already stored in the UE context (and/or MM/RM context).

CM may be used to establish and release a signaling connection between the UE 6201 and the AMF 6221 over the N1 interface. The signaling connection is used to enable NAS signaling exchange between the UE 6201 and the CN 6220, and comprises both the signaling connection between the UE and the AN (e.g., RRC connection or UE-N3IWF connection for non-3GPP access) and the N2 connection for the UE 6201 between the AN (e.g., RAN 6210) and the AMF 6221. The UE 6201 may operate in one of two CM states, CM-IDLE mode or CM-CONNECTED mode. When the UE 6201 is operating in the CM-IDLE state/mode, the UE 6201 may have no NAS signaling connection established with the AMF 6221 over the N1 interface, and there may be (R)AN 6210 signaling connection (e.g., N2 and/or N3 connections) for the UE 6201. When the UE 6201 is operating in the CM-CONNECTED state/mode, the UE 6201 may have an established NAS signaling connection with the AMF 6221 over the N1 interface, and there may be a (R)AN 6210 signaling connection (e.g., N2 and/or N3 connections) for the UE 6201. Establishment of an N2 connection between the (R)AN 6210 and the AMF 6221 may cause the UE 6201 to transition from CM-IDLE mode to CM-CONNECTED mode, and the UE 6201 may transition from the CM-CONNECTED mode to the CM-IDLE mode when N2 signaling between the (R)AN 6210 and the AMF 6221 is released.

The SMF 6224 may be responsible for SM (e.g., session establishment, modify and release, including tunnel maintain between UPF and AN node); UE IP address allocation and management (including optional authorization); selection and control of UP function; configuring traffic steering at UPF to route traffic to proper destination; termination of interfaces toward policy control functions; controlling part of policy enforcement and QoS; lawful intercept (for SM events and interface to LI system); termination of SM parts of NAS messages; downlink data notification; initiating AN specific SM information, sent via AMF over N2 to AN; and determining SSC mode of a session. SM may refer to management of a PDU session, and a PDU session or "session" may refer to a PDU connectivity service that provides or enables the exchange of PDUs between a UE 6201 and a data network (DN) 6203 identified by a Data Network Name (DNN). PDU sessions may be established upon UE 6201 request, modified upon UE 6201 and 5GC 6220 request, and released upon UE 6201 and 5GC 6220 request using NAS SM signaling exchanged over the N1 reference point between the UE 6201 and the SMF 6224. Upon request from an application server, the 5GC 6220 may trigger a specific application in the UE 6201. In response to receipt of the trigger message, the UE 6201 may pass the trigger message (or relevant parts/information of the trigger message) to one or more identified applications in the UE 6201. The identified application(s) in the UE 6201 may establish a PDU session to a specific DNN. The SMF 6224 may check whether the UE 6201 requests are compliant with user subscription information associated with the UE 6201. In this regard, the SMF 6224 may retrieve and/or request to receive update notifications on SMF 6224 level subscription data from the UDM 6227.

The SMF 6224 may include the following roaming functionality: handling local enforcement to apply QoS SLAB (VPLMN); charging data collection and charging interface (VPLMN); lawful intercept (in VPLMN for SM events and interface to LI system); and support for interaction with external DN for transport of signalling for PDU session authorization/authentication by external DN. An N16 reference point between two SMFs 6224 may be included in the system 6200, which may be between another SMF 6224 in a visited network and the SMF 6224 in the home network in roaming scenarios. Additionally, the SMF 6224 may exhibit the Nsmf service-based interface.

The NEF 6223 may provide means for securely exposing the services and capabilities provided by 3GPP network functions for third party, internal exposure/re-exposure, Application Functions (e.g., AF 6228), edge computing or fog computing systems, etc. In such embodiments, the NEF 6223 may authenticate, authorize, and/or throttle the AFs. NEF 6223 may also translate information exchanged with the AF 6228 and information exchanged with internal network functions. For example, the NEF 6223 may translate between an AF-Service-Identifier and an internal 5GC information. NEF 6223 may also receive information from other network functions (NFs) based on exposed capabilities of other network functions. This information may be stored at the NEF 6223 as structured data, or at a data storage NF using standardized interfaces. The stored information can then be re-exposed by the NEF 6223 to other NFs and AFs, and/or used for other purposes such as analytics. Additionally, the NEF 6223 may exhibit an Nnef service-based interface.

The NRF 6225 may support service discovery functions, receive NF discovery requests from NF instances, and provide the information of the discovered NF instances to the NF instances. NRF 6225 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 6225 may exhibit the Nnrf service-based interface.

The PCF 6226 may provide policy rules to control plane function(s) to enforce them, and may also support unified policy framework to govern network behaviour. The PCF 6226 may also implement an FE to access subscription information relevant for policy decisions in a UDR of the UDM 6227. The PCF 6226 may communicate with the AMF 6221 via an N15 reference point between the PCF 6226 and the AMF 6221, which may include a PCF 6226 in a visited network and the AMF 6221 in case of roaming scenarios. The PCF 6226 may communicate with the AF 6228 via an N5 reference point between the PCF 6226 and the AF 6228; and with the SMF 6224 via an N7 reference point between the PCF 6226 and the SMF 6224. The system 6200 and/or CN 6220 may also include an N24 reference point between the PCF 6226 (in the home network) and a PCF 6226 in a visited network. Additionally, the PCF 6226 may exhibit an Npcf service-based interface.

The UDM 6227 may handle subscription-related information to support the network entities' handling of communication sessions, and may store subscription data of UE 6201. For example, subscription data may be communicated between the UDM 6227 and the AMF 6221 via an N8 reference point between the UDM 6227 and the AMF. The UDM 6227 may include two parts, an application FE and a UDR (the FE and UDR are not shown by FIG. 6B). The UDR may store subscription data and policy data for the UDM 6227 and the PCF 6226, and/or structured data for exposure and application data (including PFDs for application detection, application request information for multiple UEs 6201) for the NEF 6223. The Nudr service-based interface may be exhibited by the UDR 221 to allow the UDM 6227, PCF 6226, and NEF 6223 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. The UDR may interact with the SMF 6224 via an N10 reference point between the UDM 6227 and the SMF 6224. UDM 6227 may also support SMS management, wherein an SMS-FE implements the similar application logic as discussed previously. Additionally, the UDM 6227 may exhibit the Nudm service-based interface.

The AF 6228 may provide application influence on traffic routing, provide access to the NCE, and interact with the policy framework for policy control. The NCE may be a mechanism that allows the 5GC 6220 and AF 6228 to provide information to each other via NEF 6223, which may be used for edge computing implementations. In such implementations, the network operator and third party services may be hosted close to the UE 6201 access point of attachment to achieve an efficient service delivery through the reduced end-to-end latency and load on the transport network. For edge computing implementations, the 5GC may select a UPF 6202 close to the UE 6201 and execute traffic steering from the UPF 6202 to DN 6203 via the N6 interface. This may be based on the UE subscription data, UE location, and information provided by the AF 6228. In this way, the AF 6228 may influence UPF (re)selection and traffic routing. Based on operator deployment, when AF 6228 is considered to be a trusted entity, the network operator may permit AF 6228 to interact directly with relevant NFs. Additionally, the AF 6228 may exhibit an Naf service-based interface.

The NSSF 6229 may select a set of network slice instances serving the UE 6201. The NSSF 6229 may also determine allowed NSSAI and the mapping to the subscribed S-NSSAIs, if needed. The NSSF 6229 may also determine the AMF set to be used to serve the UE 6201, or a list of candidate AMF(s) 6221 based on a suitable configuration and possibly by querying the NRF 6225. The selection of a set of network slice instances for the UE 6201 may be triggered by the AMF 6221 with which the UE 6201 is registered by interacting with the NSSF 6229, which may lead to a change of AMF 6221. The NSSF 6229 may interact with the AMF 6221 via an N22 reference point between AMF 6221 and NSSF 6229; and may communicate with another NSSF 6229 in a visited network via an N31 reference point (not shown by FIG. 6B). Additionally, the NSSF 6229 may exhibit an Nnssf service-based interface.

As discussed previously, the CN 6220 may include an SMSF, which may be responsible for SMS subscription checking and verification, and relaying SM messages to/from the UE 6201 to/from other entities, such as an SMS-GMSC/IWMSC/SMS-router. The SMS may also interact with AMF 6221 and UDM 6227 for a notification procedure that the UE 6201 is available for SMS transfer (e.g., set a UE not reachable flag, and notifying UDM 6227 when UE 6201 is available for SMS).

The CN 120 may also include other elements that are not shown by FIG. 6B, such as a Data Storage system/architecture, a 5G-EIR, a SEPP, and the like. The Data Storage system may include a SDSF, an UDSF, and/or the like. Any NF may store and retrieve unstructured data into/from the UDSF (e.g., UE contexts), via N18 reference point between any NF and the UDSF (not shown by FIG. 6B). Individual NFs may share a UDSF for storing their respective unstructured data or individual NFs may each have their own UDSF located at or near the individual NFs. Additionally, the UDSF may exhibit an Nudsf service-based interface (not shown by FIG. 6B). The 5G-EIR may be an NF that checks the status of PEI for determining whether particular equipment/entities are blacklisted from the network; and the SEPP may be a non-transparent proxy that performs topology hiding, message filtering, and policing on inter-PLMN control plane interfaces.

Additionally, there may be many more reference points and/or service-based interfaces between the NF services in the NFs; however, these interfaces and reference points have been omitted from FIG. 6B for clarity. In one example, the CN 6220 may include an Nx interface, which is an inter-CN interface between the MME (e.g., MME 6121) and the AMF 6221 in order to enable interworking between CN 6220 and CN 6120. Other example interfaces/reference points may include an N5g-EIR service-based interface exhibited by a 5G-EIR, an N27 reference point between the NRF in the visited network and the NRF in the home network; and an N31 reference point between the NSSF in the visited network and the NSSF in the home network.

Figure 7A:
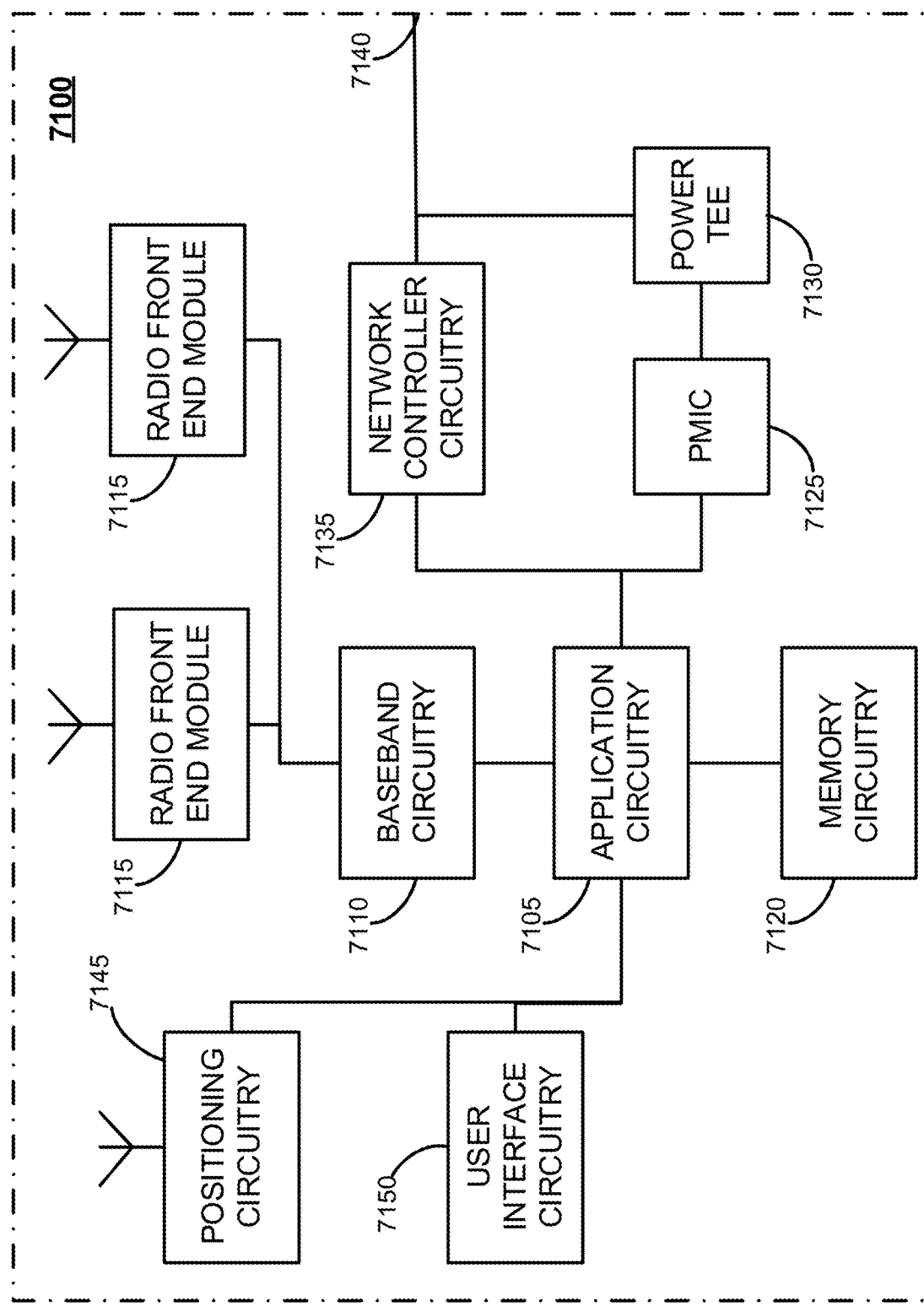
FIG. 7A illustrates an example of infrastructure equipment in accordance with various embodiments.

FIG. 7A illustrates an example of infrastructure equipment 7100 in accordance with various embodiments. The infrastructure equipment 7100 (or "system 7100") may be implemented as a base station, radio head, RAN node such as the RAN nodes 511 and/or AP 506 shown and described previously, application server(s) 530, and/or any other element/device discussed herein. In other examples, the system 7100 could be implemented in or by a UE.

The system 7100 includes application circuitry 7105, baseband circuitry 7110, one or more radio front end modules (RFEMs) 7115, memory circuitry 7120, power management integrated circuitry (PMIC) 7125, power tee circuitry 7130, network controller circuitry 7135, network interface connector 7140, satellite positioning circuitry 7145, and user interface 7150. In some embodiments, the device 7100 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 7105 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 7105 may be coupled with or may include memory/storage elements and may be configured to execute instructions stored in the memory/storage to enable various applications or operating systems to run on the system 7100. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 7105 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 7105 may comprise, or may be, a special-purpose processor/controller to operate according to the various embodiments herein. As examples, the processor(s) of application circuitry 7105 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 7100 may not utilize application circuitry 7105, and instead may include a special-purpose processor/controller to process IP data received from an EPC or 5GC, for example.

In some implementations, the application circuitry 7105 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 7105 may comprise logic blocks or logic fabric, and other interconnected resources that may be programmed to perform various functions, such as the procedures, methods, functions, etc. of the various embodiments discussed herein. In such embodiments, the circuitry of application circuitry 7105 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

The baseband circuitry 7110 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 7110 are discussed infra with regard to FIG. 8.

User interface circuitry 7150 may include one or more user interfaces designed to enable user interaction with the system 7100 or peripheral component interfaces designed to enable peripheral component interaction with the system 7100. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 7115 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 8111 of FIG. 8 infra), and the RFEM may be connected to multiple antennas. In alternative implementations, both mmWave and sub-mmWave radio functions may be implemented in the same physical RFEM 7115, which incorporates both mmWave antennas and sub-mmWave.

The memory circuitry 7120 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 7120 may be implemented as one or more of solder down packaged integrated circuits, socketed memory modules and plug-in memory cards.

The PMIC 7125 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 7130 may provide for electrical power drawn from a network cable to provide both power supply and data connectivity to the infrastructure equipment 7100 using a single cable.

The network controller circuitry 7135 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 7100 via network interface connector 7140 using a physical connection, which may be electrical (commonly referred to as a "copper interconnect"), optical, or wireless. The network controller circuitry 7135 may include one or more dedicated processors and/or FPGAs to communicate using one or more of the aforementioned protocols. In some implementations, the network controller circuitry 7135 may include multiple controllers to provide connectivity to other networks using the same or different protocols.

The positioning circuitry 7145 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 7145 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 7145 may include a Micro-Technology for Positioning, Navigation, and Timing (Micro-PNT) IC that uses a master timing clock to perform position tracking/estimation without GNSS assistance. The positioning circuitry 7145 may also be part of, or interact with, the baseband circuitry 7110 and/or RFEMs 7115 to communicate with the nodes and components of the positioning network. The positioning circuitry 7145 may also provide position data and/or time data to the application circuitry 7105, which may use the data to synchronize operations with various infrastructure (e.g., RAN nodes 511, etc.), or the like.

The components shown by FIG. 7A may communicate with one another using interface circuitry, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system. Other bus/IX systems may be included, such as an I2C interface, an SPI interface, point to point interfaces, and a power bus, among others.

Figure 7B:
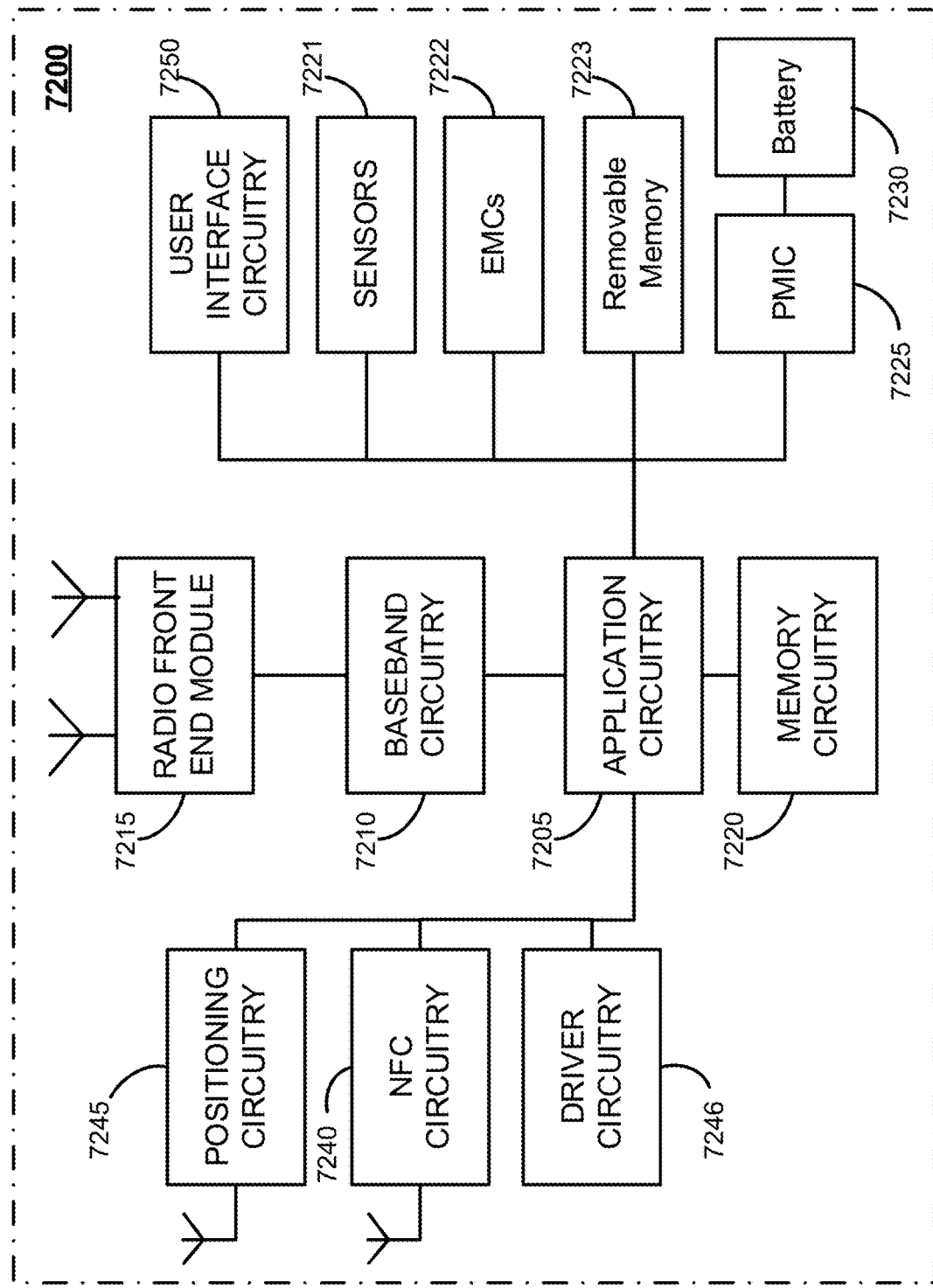
FIG. 7B illustrates an example of a platform (or "device") in accordance with various embodiments.

FIG. 7B illustrates an example of a platform 7200 (or "device 7200") in accordance with various embodiments. In embodiments, the computer platform 7200 may be suitable for use as UEs 501, 6101, 6201, application servers 530, and/or any other element/device discussed herein. The platform 7200 may include any combinations of the components shown in the example. The components of platform 7200 may be implemented as integrated circuits (ICs), portions thereof, discrete electronic devices, or other modules, logic, hardware, software, firmware, or a combination thereof adapted in the computer platform 7200, or as components otherwise incorporated within a chassis of a larger system. The block diagram of FIG. 7B is intended to show a high level view of components of the computer platform 7200. However, some of the components shown may be omitted, additional components may be present, and different arrangement of the components shown may occur in other implementations.

Application circuitry 7205 includes circuitry such as, but not limited to one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 7205 may be coupled with or may include memory/storage elements and may be configured to execute instructions stored in the memory/storage to enable various applications or operating systems to run on the system 7200. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 7105 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 7105 may comprise, or may be, a special-purpose processor/controller to operate according to the various embodiments herein.

As examples, the processor(s) of application circuitry 7205 may include an Intel® Architecture Core™ based processor, such as a Quark™, an Atom™, an i3, an i5, an i7, or an MCU-class processor, or another such processor available from Intel® Corporation, Santa Clara, Calif. The processors of the application circuitry 7205 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 7205 may be a part of a system on a chip (SoC) in which the application circuitry 7205 and other components are formed into a single integrated circuit, or a single package, such as the Edison™ or Galileo™ SoC boards from Intel® Corporation.

Additionally or alternatively, application circuitry 7205 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 7205 may comprise logic blocks or logic fabric, and other interconnected resources that may be programmed to perform various functions, such as the procedures, methods, functions, etc. of the various embodiments discussed herein. In such embodiments, the circuitry of application circuitry 7205 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 7210 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 7210 are discussed infra with regard to FIG. 8.

The RFEMs 7215 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 8111 of FIG. 8 infra), and the RFEM may be connected to multiple antennas. In alternative implementations, both mmWave and sub-mmWave radio functions may be implemented in the same physical RFEM 7215, which incorporates both mmWave antennas and sub-mmWave.

The memory circuitry 7220 may include any number and type of memory devices used to provide for a given amount of system memory. As examples, the memory circuitry 7220 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 7220 may be developed in accordance with a Joint Electron Devices Engineering Council (JEDEC) low power double data rate (LPDDR)-based design, such as LPDDR2, LPDDR3, LPDDR4, or the like. Memory circuitry 7220 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 7220 may be on-die memory or registers associated with the application circuitry 7205. To provide for persistent storage of information such as data, applications, operating systems and so forth, memory circuitry 7220 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 7200 may incorporate the three-dimensional (3D) cross-point (XPOINT) memories from Intel® and Micron®.

Removable memory circuitry 7223 may include devices, circuitry, enclosures/housings, ports or receptacles, etc. used to couple portable data storage devices with the platform 7200. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 7200 may also include interface circuitry (not shown) that is used to connect external devices with the platform 7200. The external devices connected to the platform 7200 via the interface circuitry include sensor circuitry 7221 and electro-mechanical components (EMCs) 7222, as well as removable memory devices coupled to removable memory circuitry 7223.

The sensor circuitry 7221 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 7222 include devices, modules, or subsystems whose purpose is to enable platform 7200 to change its state, position, and/or orientation, or move or control a mechanism or (sub)system. Additionally, EMCs 7222 may be configured to generate and send messages/signalling to other components of the platform 7200 to indicate a current state of the EMCs 7222. Examples of the EMCs 7222 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 7200 is configured to operate one or more EMCs 7222 based on one or more captured events and/or instructions or control signals received from a service provider and/or various clients.

In some implementations, the interface circuitry may connect the platform 7200 with positioning circuitry 7245. The positioning circuitry 7245 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 7245 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 7245 may include a Micro-PNT IC that uses a master timing clock to perform position tracking/estimation without GNSS assistance. The positioning circuitry 7245 may also be part of, or interact with, the baseband circuitry 7110 and/or RFEMs 7215 to communicate with the nodes and components of the positioning network. The positioning circuitry 7245 may also provide position data and/or time data to the application circuitry 7205, which may use the data to synchronize operations with various infrastructure (e.g., radio base stations), for turn-by-turn navigation applications, or the like In some implementations, the interface circuitry may connect the platform 7200 with Near-Field Communication (NFC) circuitry 7240. NFC circuitry 7240 is configured to provide contactless, short-range communications based on radio frequency identification (RFID) standards, wherein magnetic field induction is used to enable communication between NFC circuitry 7240 and NFC-enabled devices external to the platform 7200 (e.g., an "NFC touchpoint"). NFC circuitry 7240 comprises an NFC controller coupled with an antenna element and a processor coupled with the NFC controller. The NFC controller may be a chip/IC providing NFC functionalities to the NFC circuitry 7240 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 7240, or initiate data transfer between the NFC circuitry 7240 and another active NFC device (e.g., a smartphone or an NFC-enabled POS terminal) that is proximate to the platform 7200.

The driver circuitry 7246 may include software and hardware elements that operate to control particular devices that are embedded in the platform 7200, attached to the platform 7200, or otherwise communicatively coupled with the platform 7200. The driver circuitry 7246 may include individual drivers allowing other components of the platform 7200 to interact with or control various input/output (I/O) devices that may be present within, or connected to, the platform 7200. For example, driver circuitry 7246 may include a display driver to control and allow access to a display device, a touchscreen driver to control and allow access to a touchscreen interface of the platform 7200, sensor drivers to obtain sensor readings of sensor circuitry 7221 and control and allow access to sensor circuitry 7221, EMC drivers to obtain actuator positions of the EMCs 7222 and/or control and allow access to the EMCs 7222, a camera driver to control and allow access to an embedded image capture device, audio drivers to control and allow access to one or more audio devices.

The power management integrated circuitry (PMIC) 7225 (also referred to as "power management circuitry 7225") may manage power provided to various components of the platform 7200. In particular, with respect to the baseband circuitry 7210, the PMIC 7225 may control power-source selection, voltage scaling, battery charging, or DC-to-DC conversion. The PMIC 7225 may often be included when the platform 7200 is capable of being powered by a battery 7230, for example, when the device is included in a UE 501, 6101, 6201.

In some embodiments, the PMIC 7225 may control, or otherwise be part of, various power saving mechanisms of the platform 7200. For example, if the platform 7200 is in an RRC_Connected state, where it is still connected to the RAN node as it expects to receive traffic shortly, then it may enter a state known as Discontinuous Reception Mode (DRX) after a period of inactivity. During this state, the platform 7200 may power down for brief intervals of time and thus save power. If there is no data traffic activity for an extended period of time, then the platform 7200 may transition off to an RRC Idle state, where it disconnects from the network and does not perform operations such as channel quality feedback, handover, etc. The platform 7200 goes into a very low power state and it performs paging where again it periodically wakes up to listen to the network and then powers down again. The platform 7200 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 7230 may power the platform 7200, although in some examples the platform 7200 may be mounted deployed in a fixed location, and may have a power supply coupled to an electrical grid. The battery 7230 may be a lithium ion battery, a metal-air battery, such as a zinc-air battery, an aluminum-air battery, a lithium-air battery, and the like. In some implementations, such as in V2X applications, the battery 7230 may be a typical lead-acid automotive battery.

In some implementations, the battery 7230 may be a "smart battery," which includes or is coupled with a Battery Management System (BMS) or battery monitoring integrated circuitry. The BMS may be included in the platform 7200 to track the state of charge (SoCh) of the battery 7230. The BMS may be used to monitor other parameters of the battery 7230 to provide failure predictions, such as the state of health (SoH) and the state of function (SoF) of the battery 7230. The BMS may communicate the information of the battery 7230 to the application circuitry 7205 or other components of the platform 7200. The BMS may also include an analog-to-digital (ADC) convertor that allows the application circuitry 7205 to directly monitor the voltage of the battery 7230 or the current flow from the battery 7230. The battery parameters may be used to determine actions that the platform 7200 may perform, such as transmission frequency, network operation, sensing frequency, and the like.

A power block, or other power supply coupled to an electrical grid may be coupled with the BMS to charge the battery 7230. In some examples, the power block 730 may be replaced with a wireless power receiver to obtain the power wirelessly, for example, through a loop antenna in the computer platform 7200. In these examples, a wireless battery charging circuit may be included in the BMS. The specific charging circuits chosen may depend on the size of the battery 7230, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 7250 includes various input/output (I/O) devices present within, or connected to, the platform 7200, and includes one or more user interfaces designed to enable user interaction with the platform 7200 and/or peripheral component interfaces designed to enable peripheral component interaction with the platform 7200. The user interface circuitry 7250 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Crystal Displays (LCD), LED displays, quantum dot displays, projectors, etc.), with the output of characters, graphics, multimedia objects, and the like being generated or produced from the operation of the platform 7200. The output device circuitry may also include speakers or other audio emitting devices, printer(s), and/or the like. In some embodiments, the sensor circuitry 7221 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 7200 may communicate with one another using a suitable bus or interconnect (IX) technology, which may include any number of technologies, including ISA, EISA, PCI, PCIx, PCIe, a Time-Trigger Protocol (TTP) system, a FlexRay system, or any number of other technologies. The bus/IX may be a proprietary bus/IX, for example, used in a SoC based system. Other bus/IX systems may be included, such as an I2C interface, an SPI interface, point-to-point interfaces, and a power bus, among others.

Figure 8:
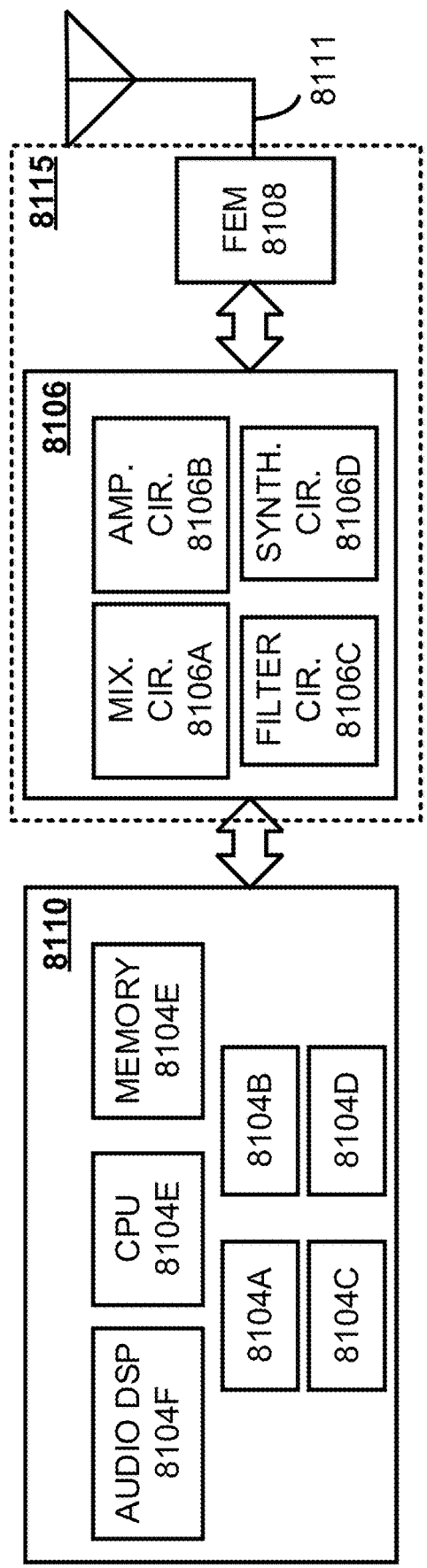
FIG. 8 illustrates example components of baseband circuitry and radio front end modules (RFEM) in accordance with various embodiments.

FIG. 8 illustrates example components of baseband circuitry 8110 and radio front end modules (RFEM) 8115 in accordance with various embodiments. The baseband circuitry 8110 corresponds to the baseband circuitry 7110 and 7210 of FIGS. 7A and 7B, respectively. The RFEM 8115 corresponds to the RFEM 7115 and 7215 of FIGS. 7A and 7B, respectively. As shown, the RFEMs 8115 may include Radio Frequency (RF) circuitry 8106, front-end module (FEM) circuitry 8108, antenna array 8111 coupled together at least as shown.

The baseband circuitry 8110 includes circuitry and/or control logic configured to carry out various radio/network protocol and radio control functions that enable communication with one or more radio networks via the RF circuitry 8106. The radio control functions may include, but are not limited to, signal modulation/demodulation, encoding/decoding, radio frequency shifting, etc. In some embodiments, modulation/demodulation circuitry of the baseband circuitry 8110 may include Fast-Fourier Transform (FFT), precoding, or constellation mapping/demapping functionality. In some embodiments, encoding/decoding circuitry of the baseband circuitry 8110 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments. The baseband circuitry 8110 is configured to process baseband signals received from a receive signal path of the RF circuitry 8106 and to generate baseband signals for a transmit signal path of the RF circuitry 8106. The baseband circuitry 8110 is configured to interface with application circuitry 7105/7205 (see FIGS. 7A and 7B) for generation and processing of the baseband signals and for controlling operations of the RF circuitry 8106. The baseband circuitry 8110 may handle various radio control functions.

The aforementioned circuitry and/or control logic of the baseband circuitry 8110 may include one or more single or multi-core processors. For example, the one or more processors may include a 3G baseband processor 8104A, a 4G/LTE baseband processor 8104B, a 5G/NR baseband processor 8104C, or some other baseband processor(s) 8104D for other existing generations, generations in development or to be developed in the future (e.g., sixth generation (6G), etc.). In other embodiments, some or all of the functionality of baseband processors 8104A-D may be included in modules stored in the memory 8104G and executed via a Central Processing Unit (CPU) 8104E. In other embodiments, some or all of the functionality of baseband processors 8104A-D may be provided as hardware accelerators (e.g., FPGAs, ASICs, etc.) loaded with the appropriate bit streams or logic blocks stored in respective memory cells. In various embodiments, the memory 8104G may store program code of a real-time OS (RTOS), which when executed by the CPU 8104E (or other baseband processor), is to cause the CPU 8104E (or other baseband processor) to manage resources of the baseband circuitry 8110, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 8110 includes one or more audio digital signal processor(s) (DSP) 8104F. The audio DSP(s) 8104F include elements for compression/decompression and echo cancellation and may include other suitable processing elements in other embodiments.

In some embodiments, each of the processors 8104A-8104E include respective memory interfaces to send/receive data to/from the memory 8104G. The baseband circuitry 8110 may further include one or more interfaces to communicatively couple to other circuitries/devices, such as an interface to send/receive data to/from memory external to the baseband circuitry 8110; an application circuitry interface to send/receive data to/from the application circuitry 7105/7205 of FIGS. 7A-8); an RF circuitry interface to send/receive data to/from RF circuitry 8106 of FIG. 8; a wireless hardware connectivity interface to send/receive data to/from one or more wireless hardware elements (e.g., Near Field Communication (NFC) components, Bluetooth®/Bluetooth® Low Energy components, Wi-Fi® components, and/or the like); and a power management interface to send/receive power or control signals to/from the PMIC 7225.

In alternate embodiments (which may be combined with the above described embodiments), baseband circuitry 8110 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 8110 may include protocol processing circuitry with one or more instances of control circuitry (not shown) to provide control functions for the digital baseband circuitry and/or radio frequency circuitry (e.g., the radio front end modules 8115).

Although not shown by FIG. 8, in some embodiments, the baseband circuitry 8110 includes individual processing device(s) to operate one or more wireless communication protocols (e.g., a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 8110 and/or RF circuitry 8106 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 8110 and/or RF circuitry 8106 are part of a Wi-Fi communication system. In the second example, the protocol processing circuitry would operate Wi-Fi MAC and logical link control (LLC) functions. The protocol processing circuitry may include one or more memory structures (e.g., 8104G) to store program code and data for operating the protocol functions, as well as one or more processing cores to execute the program code and perform various operations using the data. The baseband circuitry 8110 may also support radio communications for more than one wireless protocol.

The various hardware elements of the baseband circuitry 8110 discussed herein may be implemented, for example, as a solder-down substrate including one or more integrated circuits (ICs), a single packaged IC soldered to a main circuit board or a multi-chip module containing two or more ICs. In one example, the components of the baseband circuitry 8110 may be suitably combined in a single chip or chipset, or disposed on a same circuit board. In another example, some or all of the constituent components of the baseband circuitry 8110 and RF circuitry 8106 may be implemented together such as, for example, a system on a chip (SoC) or System-in-Package (SiP). In another example, some or all of the constituent components of the baseband circuitry 8110 may be implemented as a separate SoC that is communicatively coupled with and RF circuitry 8106 (or multiple instances of RF circuitry 8106). In yet another example, some or all of the constituent components of the baseband circuitry 8110 and the application circuitry 7105/7205 may be implemented together as individual SoCs mounted to a same circuit board (e.g., a "multi-chip package").

In some embodiments, the baseband circuitry 8110 may provide for communication compatible with one or more radio technologies. For example, in some embodiments, the baseband circuitry 8110 may support communication with an E-UTRAN or other WMAN, a WLAN, a WPAN. Embodiments in which the baseband circuitry 8110 is configured to support radio communications of more than one wireless protocol may be referred to as multi-mode baseband circuitry.

RF circuitry 8106 may enable communication with wireless networks using modulated electromagnetic radiation through a non-solid medium. In various embodiments, the RF circuitry 8106 may include switches, filters, amplifiers, etc. to facilitate the communication with the wireless network. RF circuitry 8106 may include a receive signal path, which may include circuitry to down-convert RF signals received from the FEM circuitry 8108 and provide baseband signals to the baseband circuitry 8110. RF circuitry 8106 may also include a transmit signal path, which may include circuitry to up-convert baseband signals provided by the baseband circuitry 8110 and provide RF output signals to the FEM circuitry 8108 for transmission.

In some embodiments, the receive signal path of the RF circuitry 8106 may include mixer circuitry 8106a, amplifier circuitry 8106b and filter circuitry 8106c. In some embodiments, the transmit signal path of the RF circuitry 8106 may include filter circuitry 8106c and mixer circuitry 8106a. RF circuitry 8106 may also include synthesizer circuitry 8106d for synthesizing a frequency for use by the mixer circuitry 8106a of the receive signal path and the transmit signal path. In some embodiments, the mixer circuitry 8106a of the receive signal path may be configured to down-convert RF signals received from the FEM circuitry 8108 based on the synthesized frequency provided by synthesizer circuitry 8106d. The amplifier circuitry 8106b may be configured to amplify the down-converted signals and the filter circuitry 8106c may be a low-pass filter (LPF) or band-pass filter (BPF) configured to remove unwanted signals from the down-converted signals to generate output baseband signals. Output baseband signals may be provided to the baseband circuitry 8110 for further processing. In some embodiments, the output baseband signals may be zero-frequency baseband signals, although this is not a requirement. In some embodiments, mixer circuitry 8106a of the receive signal path may comprise passive mixers, although the scope of the embodiments is not limited in this respect.

In some embodiments, the mixer circuitry 8106a of the transmit signal path may be configured to up-convert input baseband signals based on the synthesized frequency provided by the synthesizer circuitry 8106d to generate RF output signals for the FEM circuitry 8108. The baseband signals may be provided by the baseband circuitry 8110 and may be filtered by filter circuitry 8106c.

In some embodiments, the mixer circuitry 8106a of the receive signal path and the mixer circuitry 8106a of the transmit signal path may include two or more mixers and may be arranged for quadrature downconversion and upconversion, respectively. In some embodiments, the mixer circuitry 8106a of the receive signal path and the mixer circuitry 8106a of the transmit signal path may include two or more mixers and may be arranged for image rejection (e.g., Hartley image rejection). In some embodiments, the mixer circuitry 8106a of the receive signal path and the mixer circuitry 8106a of the transmit signal path may be arranged for direct downconversion and direct upconversion, respectively. In some embodiments, the mixer circuitry 8106a of the receive signal path and the mixer circuitry 8106a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 8106 may include analog-to-digital converter (ADC) and digital-to-analog converter (DAC) circuitry and the baseband circuitry 8110 may include a digital baseband interface to communicate with the RF circuitry 8106.

In some dual-mode embodiments, a separate radio IC circuitry may be provided for processing signals for each spectrum, although the scope of the embodiments is not limited in this respect.

In some embodiments, the synthesizer circuitry 8106*d* may be a fractional-N synthesizer or a fractional N/N+1 synthesizer, although the scope of the embodiments is not limited in this respect as other types of frequency synthesizers may be suitable. For example, synthesizer circuitry 8106*d* may be a delta-sigma synthesizer, a frequency multiplier, or a synthesizer comprising a phase-locked loop with a frequency divider.

The synthesizer circuitry 8106*d* may be configured to synthesize an output frequency for use by the mixer circuitry 8106*a* of the RF circuitry 8106 based on a frequency input and a divider control input. In some embodiments, the synthesizer circuitry 8106*d* may be a fractional N/N+1 synthesizer.

In some embodiments, frequency input may be provided by a voltage controlled oscillator (VCO), although that is not a requirement. Divider control input may be provided by either the baseband circuitry 8110 or the application circuitry 7105/7205 depending on the desired output frequency. In some embodiments, a divider control input (e.g., N) may be determined from a look-up table based on a channel indicated by the application circuitry 7105/7205.

Synthesizer circuitry 8106*d* of the RF circuitry 8106 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 8106*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 8106 may include an IQ/polar converter.

FEM circuitry 8108 may include a receive signal path, which may include circuitry configured to operate on RF signals received from antenna array 8111, amplify the received signals and provide the amplified versions of the received signals to the RF circuitry 8106 for further processing. FEM circuitry 8108 may also include a transmit signal path, which may include circuitry configured to amplify signals for transmission provided by the RF circuitry 8106 for transmission by one or more of antenna elements of antenna array 8111. In various embodiments, the amplification through the transmit or receive signal paths may be done solely in the RF circuitry 8106, solely in the FEM circuitry 8108, or in both the RF circuitry 8106 and the FEM circuitry 8108.

In some embodiments, the FEM circuitry 8108 may include a TX/RX switch to switch between transmit mode and receive mode operation. The FEM circuitry 8108 may include a receive signal path and a transmit signal path. The receive signal path of the FEM circuitry 8108 may include an LNA to amplify received RF signals and provide the amplified received RF signals as an output (e.g., to the RF circuitry 8106). The transmit signal path of the FEM circuitry 8108 may include a power amplifier (PA) to amplify input RF signals (e.g., provided by RF circuitry 8106), and one or more filters to generate RF signals for subsequent transmission by one or more antenna elements of the antenna array 8111.

The antenna array 8111 comprises one or more antenna elements, each of which is configured convert electrical signals into radio waves to travel through the air and to convert received radio waves into electrical signals. For example, digital baseband signals provided by the baseband circuitry 8110 is converted into analog RF signals (e.g., modulated waveform) that will be amplified and transmitted via the antenna elements of the antenna array 8111 including one or more antenna elements (not shown). The antenna elements may be omnidirectional, direction, or a combination thereof. The antenna elements may be formed in a multitude of arranges as are known and/or discussed herein. The antenna array 8111 may comprise microstrip antennas or printed antennas that are fabricated on the surface of one or more printed circuit boards. The antenna array 8111 may be formed in as a patch of metal foil (e.g., a patch antenna) in a variety of shapes, and may be coupled with the RF circuitry 8106 and/or FEM circuitry 8108 using metal transmission lines or the like.

Processors of the application circuitry 7105/7205 and processors of the baseband circuitry 8110 may be used to execute elements of one or more instances of a protocol stack. For example, processors of the baseband circuitry 8110, alone or in combination, may be used execute Layer 3, Layer 2, or Layer 1 functionality, while processors of the application circuitry 7105/7205 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

Figure 9:
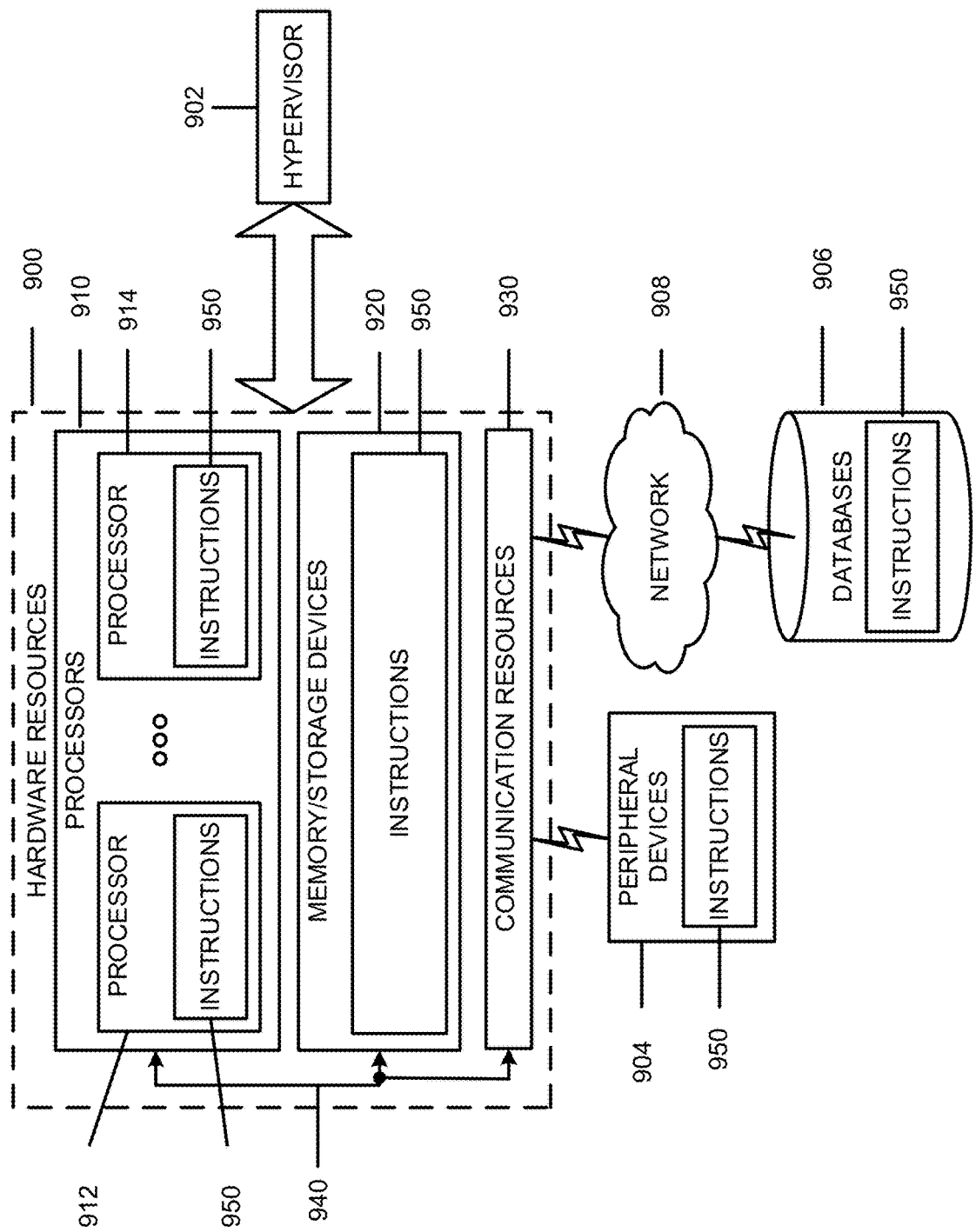
FIG. 9 is a block diagram illustrating components, according to some example embodiments, able to read instructions from a machine-readable or computer-readable medium (e.g., a non-transitory machine-readable storage medium) and perform any one or more of the methodologies discussed herein.

FIG. 9 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 9 shows a diagrammatic representation of hardware resources 900 including one or more processors (or processor cores) 910, one or more memory/storage devices 920, and one or more communication resources 930, each of which may be communicatively coupled via a bus 940. For embodiments where node virtualization (e.g., NFV) is utilized, a hypervisor 902 may be executed to provide an execution environment for one or more network slices/sub-slices to utilize the hardware resources 900.

The processors 910 may include, for example, a processor 912 and a processor 914. The processor(s) 910 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 920 may include main memory, disk storage, or any suitable combination thereof. The memory/storage devices 920 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 930 may include interconnection or network interface components or other suitable devices to communicate with one or more peripheral devices 904 or one or more databases 906 via a network 908. For example, the communication resources 930 may include wired communication components (e.g., for coupling via USB), cellular communication components, NFC components, Bluetooth® (or Bluetooth® Low Energy) components, Wi-Fi® components, and other communication components.

Instructions 950 may comprise software, a program, an application, an applet, an app, or other executable code for causing at least any of the processors 910 to perform any one or more of the methodologies discussed herein. The instructions 950 may reside, completely or partially, within at least one of the processors 910 (e.g., within the processor's cache memory), the memory/storage devices 920, or any suitable combination thereof. Furthermore, any portion of the instructions 950 may be transferred to the hardware resources 900 from any combination of the peripheral devices 904 or the databases 906. Accordingly, the memory of processors 910, the memory/storage devices 920, the peripheral devices 904, and the databases 906 are examples of computer-readable and machine-readable media.

Figure 3:
Figure 3:

In various embodiments, the devices/components of FIGS. 5-9, and particularly the baseband circuitry of FIGS. 7A-7B, may be used to practice, in whole or in part, any of the operation flow/algorithmic structures depicted in FIGS. 1-3.

One example of an operation flow/algorithmic structure is depicted in FIG. 1. In this example, operation flow/algorithmic structure 100 may include, at 105, retrieving RACH optimization information from memory, wherein the RACH optimization information comprises an indication of one or more RACH optimization targets, including a RACH optimization target associated with a user equipment (UE) access delay probability. Operation flow/algorithmic structure 100 may further include, at 110, configuring the one or more RACH optimization targets for a RACH optimization function.

Another example of an operation flow/algorithmic structure is depicted in FIG. 2. In this example, operation flow/algorithmic structure 200 may include, at 205, determining random access channel (RACH) optimization information that comprises an indication of one or more RACH optimization targets, including a RACH optimization target associated with a user equipment (UE) access delay probability. Operation flow/algorithmic structure 200 may further include, at 210, configuring the one or more RACH optimization targets for a RACH optimization function.

Another example of an operation flow/algorithmic structure is depicted in FIG. 3. In this example, operation flow/algorithmic structure 300 may include, at 305, configuring one or more random access channel (RACH) optimization targets for a RACH optimization function, wherein the one or more RACH optimization targets include a RACH optimization target associated with a user equipment (UE) access delay probability. Operation flow/algorithmic structure 300 may further include, at 310, enabling the RACH optimization function for a new radio (NR) cell.

EXAMPLES

Some non-limiting examples are provided below.

Example 1 includes an apparatus comprising: memory to store random access channel (RACH) optimization information; and processor circuitry, coupled with the memory, to: retrieve the RACH optimization information from the memory, wherein the RACH optimization information comprises an indication of one or more RACH optimization targets, including a RACH optimization target associated with a user equipment (UE) access delay probability; and configure the one or more RACH optimization targets for a RACH optimization function.

Example 2 includes the apparatus of example 1 or some other example herein, wherein the processor circuitry is further to enable the RACH optimization function for a new radio (NR) cell.

Example 3 includes the apparatus of example 1 or some other example herein, wherein the processor circuitry is further to receive a notification from the RACH optimization function indicating a change in a RACH parameter associated with the one or more RACH optimization targets.

Example 4 includes the apparatus of example 1 or some other example herein, wherein the processor circuitry is further to collect RACH-related performance measurements.

Example 5 includes the apparatus of example 4 or some other example herein, wherein the RACH-related performance measurements are collected from a RACH information report from a UE.

Example 6 includes the apparatus of example 4 or some other example herein, wherein the processor circuitry is further to analyze the RACH-related performance measurements to evaluate RACH performance.

Example 7 includes the apparatus of example 6 or some other example herein, wherein analyzing the RACH-related performance measurements includes determining that the RACH performance does not meet a target from the one or more RACH optimization targets.

Example 8 includes the apparatus of example 7 or some other example herein, wherein the processor circuitry is further to update the unmet RACH optimization target in response to determining that the optimization performance does not meet the unmet RACH optimization target.

Example 9 includes one or more non-transitory computer-readable media storing instructions that, when executed by one or more processors, are to cause a device to: determine random access channel (RACH) optimization information that comprises an indication of one or more RACH optimization targets, including a RACH optimization target associated with a user equipment (UE) access delay probability;

and configure the one or more RACH optimization targets for a RACH optimization function.

Example 10 includes the one or more non-transitory computer-readable media of example 9 or some other example herein, wherein the media further stores instructions to enable the RACH optimization function for a new radio (NR) cell.

Example 11 includes the one or more non-transitory computer-readable media of example 9 or some other example herein, wherein the media further stores instructions to receive a notification from the RACH optimization function indicating a change in a RACH parameter associated with the one or more RACH optimization targets.

Example 12 includes the one or more non-transitory computer-readable media of example 9 or some other example herein, wherein the media further stores instructions to collect RACH-related performance measurements.

Example 13 includes the one or more non-transitory computer-readable media of example 12 or some other example herein, wherein the RACH-related performance measurements are collected from a RACH information report from a UE.

Example 14 includes the one or more non-transitory computer-readable media of example 12 or some other example herein, wherein the further stores instructions to analyze the RACH-related performance measurements to evaluate RACH performance.

Example 15 includes the one or more non-transitory computer-readable media of example 14 or some other example herein, wherein analyzing the RACH-related performance measurements includes determining that the RACH performance does not meet a target from the one or more RACH optimization targets.

Example 16 includes the one or more non-transitory computer-readable media of example 15 or some other example herein, wherein the media further stores instructions to update the unmet RACH optimization target in response to determining that the optimization performance does not meet the unmet RACH optimization target.

Example 17 includes one or more non-transitory computer-readable media storing instructions that, when executed by one or more processors, are to cause a device to: configure one or more random access channel (RACH) optimization targets for a RACH optimization function, wherein the one or more RACH optimization targets include a RACH optimization target associated with a user equipment (UE) access delay probability; and enable the RACH optimization function for a new radio (NR) cell.

Example 18 includes the one or more non-transitory computer-readable media of example 17 or some other example herein, wherein the media further stores instructions to: receive a notification from the RACH optimization function indicating a change in a RACH parameter associated with the one or more RACH optimization targets.

Example 19 includes the one or more non-transitory computer-readable media of example 17 or some other example herein, wherein the media further stores instructions to: collect RACH-related performance measurements from a RACH information report from a UE; and analyze the RACH-related performance measurements to evaluate RACH performance.

Example 20 includes the one or more non-transitory computer-readable media of example 19 or some other example herein, wherein analyzing the RACH-related performance measurements includes determining that the RACH performance does not meet a target from the one or more RACH optimization targets.

Example 21 includes the one or more non-transitory computer-readable media of example 20 or some other example herein, wherein the media further stores instructions to update the unmet RACH optimization target in response to determining that the optimization performance does not meet the unmet RACH optimization target.

Example 22 may include an apparatus comprising means to perform one or more elements of a method described in or related to any of examples 1-21, or any other method or process described herein.

Example 23 may include one or more non-transitory computer-readable media comprising instructions to cause an electronic device, upon execution of the instructions by one or more processors of the electronic device, to perform one or more elements of a method described in or related to any of examples 1-21, or any other method or process described herein.

Example 24 may include an apparatus comprising logic, modules, and/or circuitry to perform one or more elements of a method described in or related to any of examples 1-21, or any other method or process described herein.

Example 25 may include a method, technique, or process as described in or related to any of examples 1-21, or portions or parts thereof.

Example 26 may include an apparatus comprising: one or more processors and one or more computer-readable media comprising instructions that, when executed by the one or more processors, cause the one or more processors to perform the method, techniques, or process as described in or related to any of examples 1-21, or portions thereof.

Example 27 may include a method of communicating in a wireless network as shown and described herein.

Example 28 may include a system for providing wireless communication as shown and described herein.

Example 29 may include a device for providing wireless communication as shown and described herein.

The description herein of illustrated implementations, including what is described in the Abstract, is not intended to be exhaustive or to limit the present disclosure to the precise forms disclosed. While specific implementations and examples are described herein for illustrative purposes, a variety of alternate or equivalent embodiments or implementations calculated to achieve the same purposes may be made in light of the above detailed description, without departing from the scope of the present disclosure.

What is claimed is:

1. An apparatus comprising:
memory to store random access channel (RACH) optimization information; and
processor circuitry, coupled with the memory, to:
retrieve the RACH optimization information from the memory, wherein the RACH optimization information comprises an indication of one or more RACH optimization targets, including a RACH optimization target associated with a user equipment (UE) access delay probability;
configure the one or more RACH optimization targets for a RACH optimization function;
enable the RACH optimization function for a new radio (NR) cell;
identify, based on one or more RACH-related performance measurements, that RACH performance does not meet a RACH optimization target of the one or more RACH optimization targets; and
update the unmet RACH optimization target in response to the identification that RACH performance does not meet the RACH optimization target.

2. The apparatus of claim 1, wherein the processor circuitry is further to receive a notification from the RACH optimization function indicating a change in a RACH parameter associated with the one or more RACH optimization targets.

3. The apparatus of claim 1, wherein the processor circuitry is further to collect the one or more RACH-related performance measurements.

4. The apparatus of claim 3, wherein the one or more RACH-related performance measurements are collected from a RACH information report from a UE.

5. One or more non-transitory computer-readable media storing instructions that, when executed by one or more processors, are to cause a device to:
   determine random access channel (RACH) optimization information that comprises an indication of one or more RACH optimization targets, including a RACH optimization target associated with a user equipment (UE) access delay probability;
   configure the one or more RACH optimization targets for a RACH optimization function;
   enable the RACH optimization function for a new radio (NR) cell;
   identify, based on one or more RACH-related performance measurements, that RACH performance does not meet a RACH optimization target of the one or more RACH optimization targets; and
   update the unmet RACH optimization target in response to the identification that RACH performance does not meet the RACH optimization target.

6. The one or more non-transitory computer-readable media of claim 5, wherein the media further stores instructions to receive a notification from the RACH optimization function indicating a change in a RACH parameter associated with the one or more RACH optimization targets.

7. The one or more non-transitory computer-readable media of claim 5, wherein the media further stores instructions to collect the one or more RACH-related performance measurements.

8. The one or more non-transitory computer-readable media of claim 7, wherein the one or more RACH-related performance measurements are collected from a RACH information report from a UE.

9. One or more non-transitory computer-readable media storing instructions that, when executed by one or more processors, are to cause a device to:
   configure one or more random access channel (RACH) optimization targets for a RACH optimization function of a new radio (NR) cell, wherein the one or more RACH optimization targets include a RACH optimization target associated with a user equipment (UE) access delay probability;
   enable the RACH optimization function for a new radio (NR) cell;
   determine, based on one or more RACH-related performance measurements, that the RACH performance does not meet a RACH optimization target from the one or more RACH optimization targets; and
   update the unmet RACH optimization target in response to the determination that the optimization performance does not meet the unmet RACH optimization target.

10. The one or more non-transitory computer-readable media of claim 9, wherein the media further stores instructions to:
    receive a notification from the RACH optimization function indicating a change in a RACH parameter associated with the one or more RACH optimization targets.

11. The one or more non-transitory computer-readable media of claim 9, wherein the media further stores instructions to:
    collect the one or more RACH-related performance measurements from a RACH information report from a UE.

* * * * *